US012768785B2

(12) United States Patent
Chou et al.

(10) Patent No.: US 12,768,785 B2
(45) Date of Patent: Oct. 20, 2026

(54) SURFACE PLASMON RESONANCE SENSOR, SURFACE PLASMON RESONANCE SENSING INSTRUMENT COMPRISING THE SAME AND METHOD FOR DETECTING AN ANALYTE USING THE SAME

(71) Applicant: Academia Sinica, Taipei City (TW)

(72) Inventors: Chia-Fu Chou, Taipei City (TW); Pei-Kuen Wei, Taipei City (TW); Liang-Kun Yu, Taipei City (TW); Deng-Kai Yang, Taipei City (TW); Jui-Hong Weng, Taipei City (TW); Kuang-Li Lee, Taipei City (TW); Shu-Cheng Lo, Taipei City (TW)

(73) Assignee: ACADEMIA SINICA, Taipei City (TW)

( * ) Notice: Subject to any disclaimer, the term of this patent is extended or adjusted under 35 U.S.C. 154(b) by 145 days.

(21) Appl. No.: 18/417,471

(22) Filed: Jan. 19, 2024

(65) Prior Publication Data

US 2024/0248033 A1 Jul. 25, 2024

Related U.S. Application Data

(60) Provisional application No. 63/439,923, filed on Jan. 19, 2023.

(51) Int. Cl.

| | |
|---|---|
| ***G01N 21/552*** | (2014.01) |
| ***B82Y 15/00*** | (2011.01) |
| ***G01N 21/19*** | (2006.01) |
| *G01N 21/25* | (2006.01) |

(52) U.S. Cl.

CPC ............ *G01N 21/554* (2013.01); *B82Y 15/00* (2013.01); *G01N 21/19* (2013.01); *G01N 2021/258* (2013.01); *G01N 2201/0633* (2013.01)

(58) Field of Classification Search

CPC ................. G01N 21/554; G01N 21/19; G01N 2021/258; G01N 2201/0633; B82Y 15/00

See application file for complete search history.

(56) References Cited

U.S. PATENT DOCUMENTS

| | | | | | |
|---|---|---|---|---|---|
| 5,468,606 | A * | 11/1995 | Bogart | G01N 33/54373 | 436/805 |
| 8,958,070 | B2 * | 2/2015 | Wang | G01N 21/00 | 356/432 |
| 2002/0135780 | A1 * | 9/2002 | Budach | G01N 21/6452 | 356/521 |
| 2004/0254419 | A1 * | 12/2004 | Wang | A61L 31/18 | 424/1.11 |
| 2005/0107870 | A1 * | 5/2005 | Wang | B82Y 25/00 | 623/1.44 |

(Continued)

FOREIGN PATENT DOCUMENTS

WO WO-2013072251 A1 * 5/2013 ............. H10K 50/11

*Primary Examiner* — Mohamed K Amara

(74) *Attorney, Agent, or Firm* — BACON & THOMAS, PLLC

(57) ABSTRACT

A surface plasmon resonance sensor is provided, which comprises: a substrate; an adaptation layer disposed on the substrate and comprising a dielectric material; and a metal layer disposed on the adaptation layer, wherein the metal layer has a grating structure comprising plural metal lines. Furthermore, a surface plasmon resonance sensing instrument comprising the same and a method for detecting an analyte using the same are also provided.

15 Claims, 20 Drawing Sheets

(56) References Cited

U.S. PATENT DOCUMENTS

| | | | | |
|---|---|---|---|---|
| 2006/0008206 | A1* | 1/2006 | Maisenhoelder | G02B 6/124 385/37 |
| 2009/0181857 | A1* | 7/2009 | Wei | G01N 21/554 506/30 |
| 2011/0128536 | A1* | 6/2011 | Bond | B81C 1/00373 430/324 |
| 2011/0200787 | A1* | 8/2011 | Regan | H01J 37/20 216/36 |
| 2012/0086021 | A1* | 4/2012 | Wang | G01N 21/00 257/E29.166 |
| 2012/0161098 | A1* | 6/2012 | Hiura | H10D 62/882 977/734 |
| 2013/0120748 | A1* | 5/2013 | Li | G01N 21/658 356/301 |
| 2014/0023321 | A1* | 1/2014 | Lu | G02F 1/015 438/69 |
| 2014/0318596 | A1* | 10/2014 | Juluri | H10F 77/251 136/255 |
| 2015/0034930 | A1* | 2/2015 | Reusch | H10K 50/11 257/40 |
| 2015/0132548 | A1* | 5/2015 | Davis | H01L 21/30604 428/201 |
| 2015/0223738 | A1* | 8/2015 | Walavalkar | A61B 5/1459 600/478 |
| 2015/0253321 | A1* | 9/2015 | Chou | G01N 33/54366 435/7.1 |
| 2017/0081782 | A1* | 3/2017 | Yoon | C30B 29/02 |
| 2018/0200785 | A1* | 7/2018 | Cao | H10D 62/118 |
| 2019/0219747 | A1* | 7/2019 | Beechem, III | G02B 5/008 |
| 2021/0057337 | A1* | 2/2021 | Han | G03F 7/0002 |
| 2023/0204508 | A1* | 6/2023 | Wei | G01N 33/54373 356/301 |
| 2023/0266291 | A1* | 8/2023 | Myrick | G01N 31/223 |

* cited by examiner

SURFACE PLASMON RESONANCE SENSOR, SURFACE PLASMON RESONANCE SENSING INSTRUMENT COMPRISING THE SAME AND METHOD FOR DETECTING AN ANALYTE USING THE SAME

CROSS-REFERENCE TO RELATED APPLICATIONS

This application claims the benefit of filing date of U.S. Provisional Application Ser. No. 63/439,923, filed Jan. 19, 2023 under 35 USC § 119(e)(1).

BACKGROUND OF THE INVENTION

Field

The present invention relates to a surface plasmon resonance (SPR) sensor, a surface plasmon resonance sensing instrument comprising the same and a method for detecting an analyte using the same. In particular, the present invention relates to a surface plasmon resonance sensor with improved SPR sensitivity, a surface plasmon resonance sensing instrument comprising the same and a method for detecting an analyte using the same.

Description of Related Art

Prism-based surface plasmon resonance (SPR) sensing on a silica-based platform is the most commonly used label-free technique in bio/pharmaceutical research. A prism-free metallic nanostructures-based SPR system can use normal incidence light to induce SPR signal, provides a more cost-effective way to achieve chip-based and high-throughput for detection applications. Due to the chemical stability of gold, gold-coated SPR sensors are mainly implemented, while adhesion layers have been reported to ensure robust adhesion of gold to the silicon/silica substrate, but it could reduce SPR sensitivity.

Therefore, it is desirable to provide a novel surface plasmon resonance sensor with improved SPR sensitivity.

SUMMARY OF THE INVENTION

An object of the present invention is to provide a novel surface plasmon resonance sensor with improved SPR sensitivity.

The surface plasmon resonance (SPR) sensor of the present invention comprises: a substrate; an adaptation layer disposed on the substrate and comprising a dielectric material; and a metal layer disposed on the adaptation layer, wherein the metal layer has a grating structure comprising plural metal lines.

Metallic nanostructures have been reported to induce surface plasmon resonance (SPR) by normal incident light. In physics, a Fano resonance is a phenomenon caused by interference between the resonant and background scattering probabilities, and the Fano resonance dip in SPR spectra presents an asymmetric profile. In sensing applications, the deposition of molecules on the sensing surface causes a change in the refractive index and thus the shift of the Fano resonance dip. In general, the smaller the full width at half maximum (FWHM) of the Fano resonance dip, the higher the sensitivity for molecular deposition.

In silicon/silica-based SPR chips, an adhesion layer is used to stabilize the gold film on the silicon/silica surface. However, it has been reported that SPR signals are affected by the conformation of metal nanostructures and adhesion layer materials. Thus, the present invention is mainly to design different nanostructures with adaptation layers for optimized SPR signal.

More specifically, in the SPR sensor of the present invention with specific signal-enhancing metallic nanostructures, the dielectric material with low SPR signal interference is used in the adaptation layer. In some embodiments, among the multi-layer structure, the adaptation layer plays a critical role that shows the ability to regulate the plasma distribution so that the SPR sensitivity can be greatly improved under an optimized condition.

In one embodiment, the adaptation layer comprises a dielectric material. In one embodiment, the adaptation layer may comprise a transparent dielectric material. In one embodiment, the adaptation layer may comprise a metal oxide, a silane compound or a combination thereof. In one embodiment, the adaptation layer may comprise $Y_2O_3$, $SiO_2$, (3-aminopropyl)triethoxysilane (APTES) or a combination thereof.

In one embodiment, the material of the adaptation layer may have a refractive index ranging from 1.3 to 1.9, and preferably from 1.4 to 1.7. More specifically, the refractive index of the material of the adaptation layer is close to the refractive index of the biomolecule to be detected.

In one embodiment, the thickness of the adaptation layer may be greater than or equal to 0.5 nm and less than or equal to 50 nm. In one embodiment, the thickness of the adaptation layer may be greater than or equal to 0.5 nm and less than or equal to 40 nm. In one embodiment, the thickness of the adaptation layer may be greater than or equal to 0.5 nm and less than or equal to 30 nm.

The thickness of the adaptation layer may be adjusted according to the material of the adaptation layer. For example, when the material of the adaptation layer is metal oxide (such as $Y_2O_3$ or $SiO_2$), the thickness of the adaptation layer may range from 0.5 nm to 50 nm, 1 nm to 40 nm, 1 nm to 30 nm or 2 nm to 30 nm. When the material of the adaptation layer is a silane compound (such as APTES), the thickness of the adaptation layer may range from 0.5 nm to 10 nm, 0.5 nm to 5 nm, 0.5 nm to 4 nm, 0.5 nm to 3 nm, 0.5 nm to 2 nm or 0.5 nm to 1 nm.

In one embodiment, the adaptation layer may have a single-layer structure or a multi-layer structure. When the adaptation layer has the single-layer structure, the material of the adaptation layer has to have good adhesion to the metal layer disposed thereon. When the adaptation layer has the multi-layer structure, the material of the outmost layer of the multi-layer structure has to have good adhesion to the metal layer disposed thereon. When the adaptation layer has the multi-layer structure, other adhesion layer known in the art (for example, the Ti layer) may be comprised in the multi-layer structure, as long as the material of the outmost layer of the multi-layer structure has to have good adhesion to the metal layer disposed thereon.

In one embodiment, the metal layer disposed on the adaptation layer has the grating structure comprising plural metal lines, and the metal lines are substantially parallel to each other. In one embodiment, the grating structure may further comprise plural recesses, and the recesses and the metal lines are alternately arranged.

In one embodiment, the grating structure may have a period of between 300 nm and 800 nm, 300 nm and 700 nm, 300 nm and 600 nm, 350 nm and 600 nm, 350 nm and 500 nm or 390 nm and 500 nm, for example, 390 nm, 410 nm, 430 nm, 450 nm, 470 nm, 490 nm or 500 nm; but the present invention is not limited thereto. Herein, the period of the grating structure refers to the distance between the center lines of two adjacent metal lines.

In one embodiment, the metal lines may respectively have a width greater than or equal to 20 nm and less than or equal to 200 nm. In one embodiment, the metal lines may respectively have a width greater than or equal to 20 nm and less than or equal to 150 nm. In one embodiment, the metal lines may respectively have a width greater than or equal to 20 nm and less than or equal to 100 nm. In one embodiment, the metal lines may respectively have a width greater than or equal to 50 nm and less than or equal to 100 nm. In one embodiment, the metal lines may respectively have a width greater than or equal to 50 nm and less than or equal to 80 nm.

In one embodiment, the recesses may respectively have a depth less than or equal to 200 nm. In one embodiment, the recesses may respectively have a depth greater than 20 nm and less than or equal to 200 nm. In one embodiment, the recesses may respectively have a depth greater than 20 nm and less than or equal to 180 nm. In one embodiment, the recesses may respectively have a depth greater than 20 nm and less than or equal to 160 nm. In one embodiment, the recesses may respectively have a depth greater than 20 nm and less than or equal to 140 nm. In one embodiment, the recesses may respectively have a depth greater than 20 nm and less than or equal to 120 nm.

In one embodiment, the thickness of the metal layer may be greater than or equal to 20 nm and less than or equal to 150 nm. In one embodiment, the thickness of the metal layer may be greater than or equal to 20 nm and less than or equal to 100 nm. In one embodiment, the thickness of the metal layer may be greater than or equal to 20 nm and less than or equal to 80 nm. In one embodiment, the thickness of the metal layer may be greater than or equal to 20 nm and less than or equal to 50 nm. In one embodiment, the thickness of the metal layer may be greater than or equal to 30 nm and less than or equal to 50 nm.

In one embodiment, the metal layer may comprise gold. However, the present invention is not limited thereto, and any metal used in the SPR chip known in the art can be used in the present invention.

In addition, the present invention further provides a surface plasmon resonance sensing instrument comprising the aforesaid SPR sensor.

In addition to the aforesaid SPR sensor, the SPR sensing instrument of the present invention may further comprise: a light source; a polarizer disposed between the light source and the SPR sensor, wherein light emitting from the light source is converted into the polarized light by the polarizer to provide a polarized light onto the SPR sensor; and a detector arranged to detect the polarized light reflected by the SPR sensor. In addition, the SPR sensing instrument may further comprise: a collimator disposed between the light source and the SPR sensor. Furthermore, the SPR sensing instrument may further comprise: a dichroic mirror disposed between the light source and the SPR sensor, wherein the polarized light is reflected by the dichroic mirror to reach the SPR sensor, and the polarized light reflected by the SPR sensor passes through the dichroic mirror to reach the detector.

Moreover, the present invention further provides a method for detecting an analyte, comprising the following steps: providing the aforesaid SPR sensor; providing polarized light onto the SPR sensor; and detecting the polarized light reflected by the SPR sensor by a detector to obtain a reflectance spectrum. Herein, the analyte (for example, a biomolecule) is disposed on the metal layer of the SPR sensor.

Other novel features of the disclosure will become more apparent from the following detailed description when taken in conjunction with the accompanying drawings.

DETAILED DESCRIPTION OF THE INVENTION

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existent of another element described by a smaller ordinal number.

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially means that the elements contact the other element, except otherwise specified. Such interpretation is applied to other cases similar to the case of "on".

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

Figure 1:
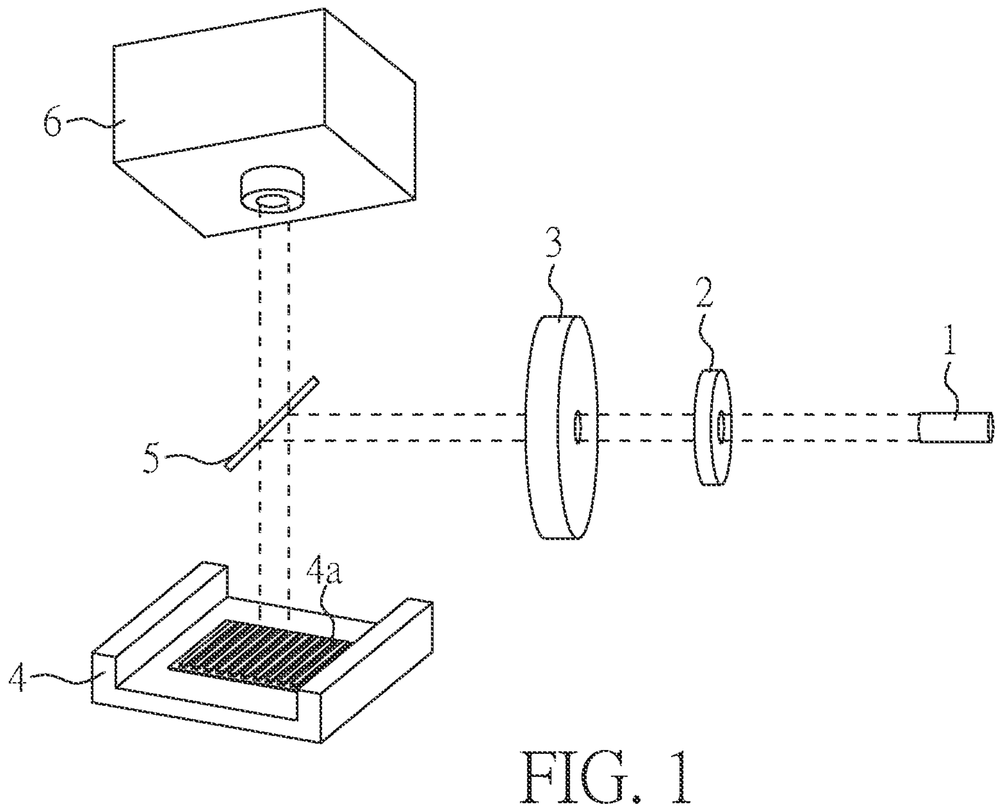
FIG. 1 is a schematic view of an SPR sensing instrument according to one embodiment of the present invention.

FIG. 1 is a schematic view of an SPR sensing instrument according to one embodiment of the present invention. The SPR sensing instrument of the present embodiment comprises: a light source 1, a polarizer 2, a collimator 3, a SPR sensor 4, a dichroic mirror 5 and a detector 6. The polarizer 2 and the collimator 3 are disposed between the light source 1 and the SPR sensor 4. The dichroic mirror 5 is disposed between the light source 1 and the SPR sensor 4, and also between the SPR sensor 4 and the detector 6. The light emitting from the light source 1 is converted into the polarized light by the polarizer 2 to provide a polarized light and passes through the collimator 3. Then, the polarized light passing the collimator 3 is reflected by the dichroic mirror 5 to reach the metal surface 4*a* of the SPR sensor 4. The polarized light reaching the SPR sensor 4 is further reflected by the SPR sensor 4 and passes through the dichroic mirror 5 to reach the detector 6, and the detector 6 can detect the polarized light reflected by the SPR sensor 4. Herein, the SPR sensing instrument of FIG. 1 is only used as an example, and the present invention is not limited thereto. Any other SPR sensing instrument known in the art can be used in the present invention.

Figure 2:
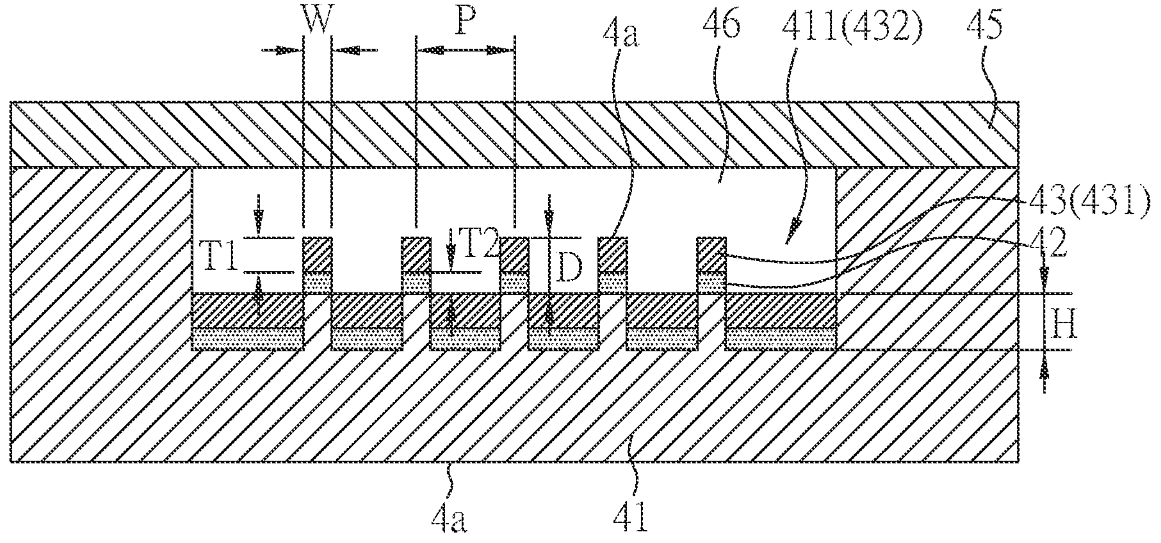
FIG. 2 is a cross-sectional view of a SPR sensor according to one embodiment of the present invention.

FIG. 2 is a cross-sectional view of a SPR sensor according to one embodiment of the present invention. The SPR sensor of the present embodiment can be prepared using any method known in the art.

For example, a substrate 41 is provided, which may a silicon substrate or a silica substrate. Herein, the substrate 41 is a silicon substrate. Next, the substrate 41 is patterned to form plural recesses 411. The method for patterning the substrate 41 may include, for example, a lithography process, a wet etching, a dry etching, any other suitable method known in the art or a combination thereof, but the present invention is not limited thereto.

Then, the adaptation layer 42 is formed on the substrate 41, and also in the recesses 411 of the substrate 41. The method for forming the adaptation layer 42 may include, for example, chemical vapor deposition, physical vapor deposition, sputtering, coating or a combination thereof; and the coating may include, for example, dip coating, spin coating, roller coating, blade coating, spray coating or a combination thereof; but the present invention is not limited thereto. The adaptation layer 42 may comprise a transparent dielectric material such as a metal oxide (such as $Y_2O_3$ or $SiO_2$), a silane compound (such as APTES) or a combination thereof.

Then, a metal layer 43 is formed on the adaptation layer 42. The method for forming the metal layer 43 may include, for example, electroplating, chemical plating, chemical vapor deposition, physical vapor deposition, sputtering, coating or a combination thereof, but the present invention is not limited thereto. In addition, the metal layer 43 may comprise gold.

After the aforesaid process, the SPR sensor of the present embodiment can be formed, which comprises: a substrate 41; an adaptation layer 42 disposed on the substrate 41 and comprising a dielectric material; and a metal layer 43 disposed on the adaptation layer 42, wherein the metal layer 43 has a grating structure comprising plural metal lines 431, and the metal lines 431 are substantially parallel to each other. In addition, the grating structure further comprises plural recesses 432, and the plural recesses 432 and the plural metal lines 431 are alternately arranged. In FIG. 2, the depth D refers to the depth of the recess 432 of the grating structure, which can be the distance from the metal surface 4*a* to the upper surface of the element in the recess 411 of the substrate 41 (for example, the upper surface of the metal line 43 in FIG. 2).

In addition, the SPR sensor of the present embodiment may further comprise: a cover substrate 45 assembled with the substrate 41. Thus, a fluidic channel 46 can be formed between the substrate 41 and the cover substrate 45, wherein a solution (for example, water, solvent or a solution containing an analyte) may fill the fluidic channel 46. The material of the cover substrate 45 may comprise, for example, glass, quartz, sapphire, ceramic, polycarbonate (PC), polyimide (PI), polyethylene terephthalate (PET), polymethylmethacrylate (PMMA), other suitable substrate materials or a combination thereof, but the present disclosure is not limited thereto.

Furthermore, the SPR sensor or the SPR sensing instrument provided above can be used in a method for detecting an analyte (for example, biomolecule). The method may comprise the following steps: providing the SPR sensing instrument shown in FIG. 1 or the SPR sensor shown in FIG. 2; providing polarized light onto the SPR sensor, wherein the analyte to be detected is disposed on the metal layer of the SPR sensor; and detecting the polarized light reflected by the SPR sensor by an detector to obtain a reflectance spectrum.

In the following experiments, the thickness T1 of the metal layer 43 is about 30-50 nm. The thickness T2 of the adaptation layer 42 is about 0.5-30 nm. The width W of the metal lines 431 are respectively about 60-70 nm. The height H of the recesses 411 is about 30-50 nm. The period P of the grating structure (i.e. the distance between two center lines of adjacent metal lines 431) is about 390-500 nm in different examples.

In the following experiments, the substrate 41 is a silicon substrate, the metal layer 43 is a gold layer, and the widths of the metal lines 431 are respectively about 65 nm. The SPR sensors with different period designs, different adaptation layers are examined in the following experiments. In addition, in the following experiments, the SPR sensor without the cover substrate 45 shown in FIG. 2 is used for simulation. The simulated dispersion diagrams (reflectance spectra with respect to wavelength and the structure parameters of SPR sensors) were calculated through the Finite-Difference Time-Domain (FDTD) method (FDTD Solution, Ansys Lumerical, Vancouver, Canada). The complex permittivities of Si, $SiO_2$, $Al_2O_3$, $Y_2O_3$, $TiO_2$ and gold were the built-in database provided by Ansys Lumerical. In the simulation, a collimated broadband plane wave from the region of visible to near infrared impinged on a unit cell of the SPR sensor with periodic boundary conditions in the in-plane (x) directions and perfectly matched layer (PML) boundary conditions in the excitation (y) direction. The polarization of incident light is transverse-magnetic (TM) for successfully generating SPR. A nonuniform mesh with a minimum mesh size of 1 nm covered the entire region of the nanostructure. The calculation was terminated once the simulation converged to the shutoff level of $1\times10^{-5}$.

Figure 3:
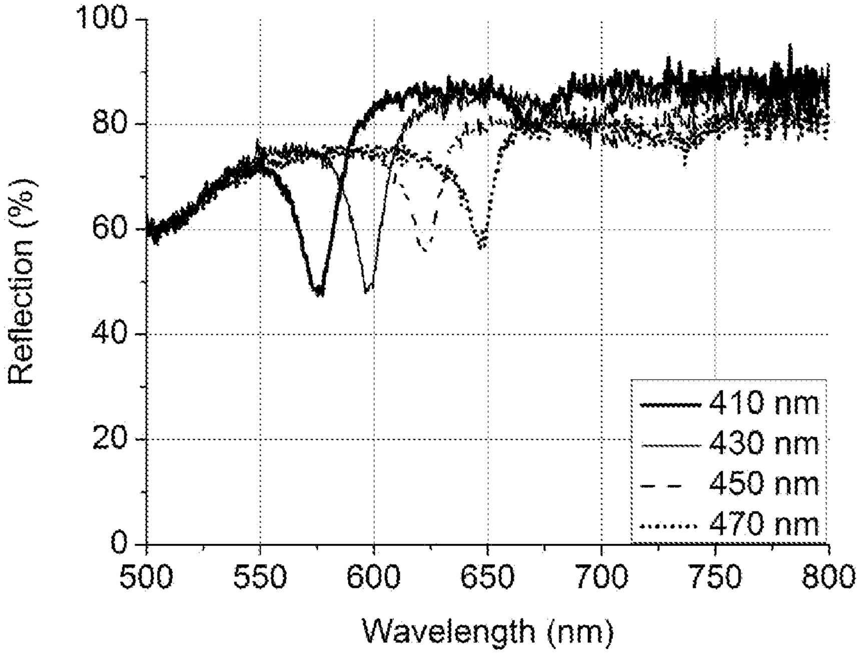
FIG. 3 is the reflection spectra of different period designs of the SPR sensors according to some embodiments of the present invention.

FIG. 3 is the reflection spectra of different period designs of the SPR sensors according to some embodiments of the present invention. As shown in FIG. 3, the reflection spectra of the fabricated SPR sensor with different periods (i.e. 410, 430 nm, 450 nm, 470 nm) with 2 nm Ti adaptation layer are similar to the simulated reflection spectra (not shown in the figure). From the simulated electric field distribution (not shown in the figure), it can be observed that different period designs can lead to different surface electric field distributions. In general, the distribution of the surface plasmon is related to the size of target molecules, and the closer the surface plasmon is to the sensor surface, the more favorable it is for the detection of small molecules.

Figure 4A:
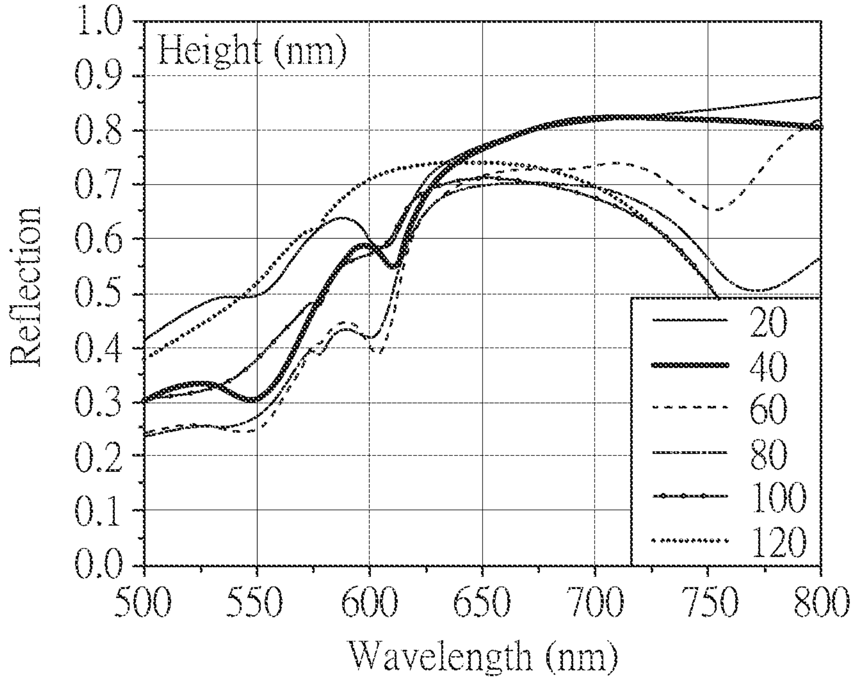
FIG. 4A to FIG. 4C are the simulated reflection spectra of SPR sensors having 470 nm-period with different structure heights, Au film thicknesses and structure widths.
Figure 4B:
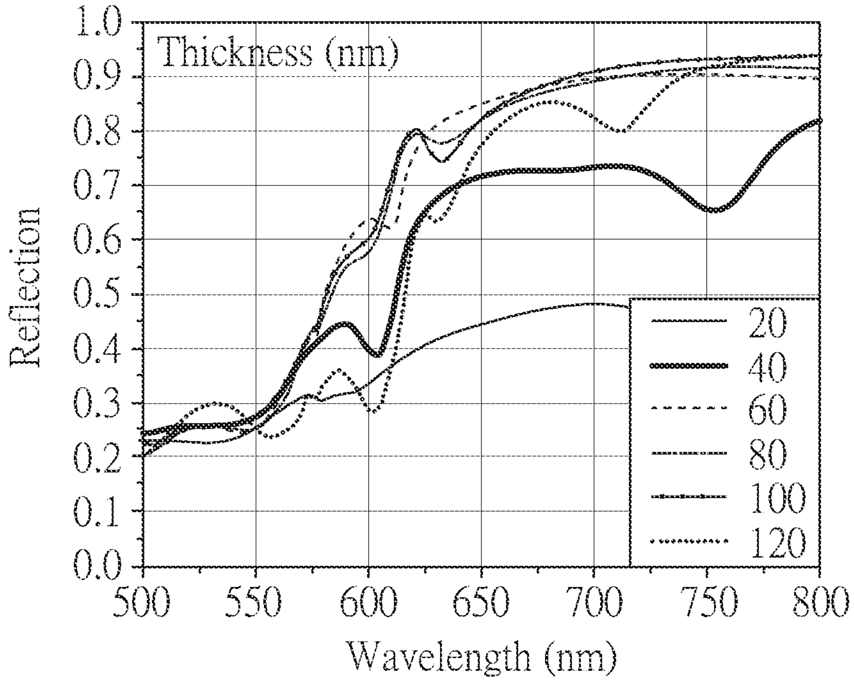
Figure 4C:
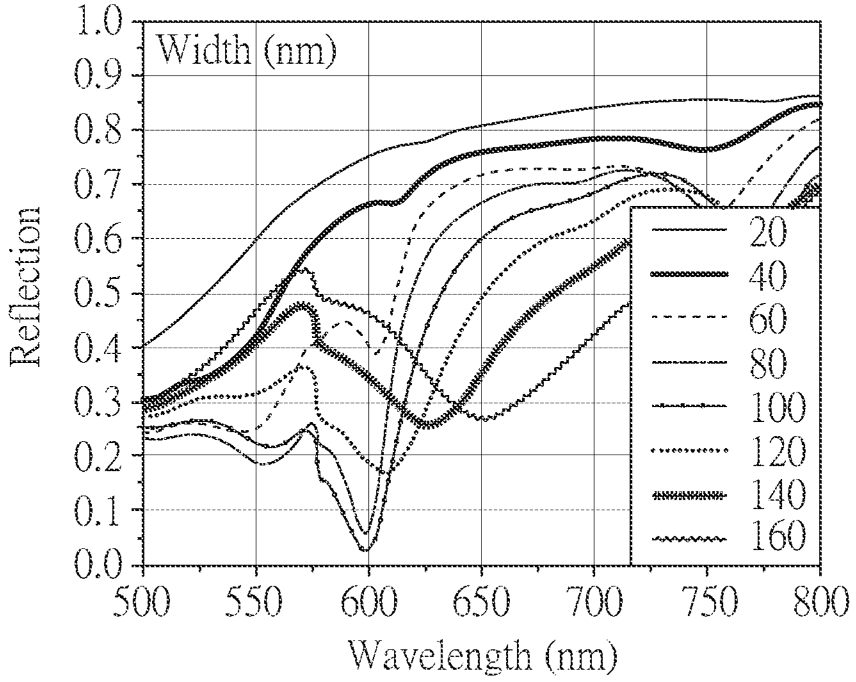
Figure 4D:
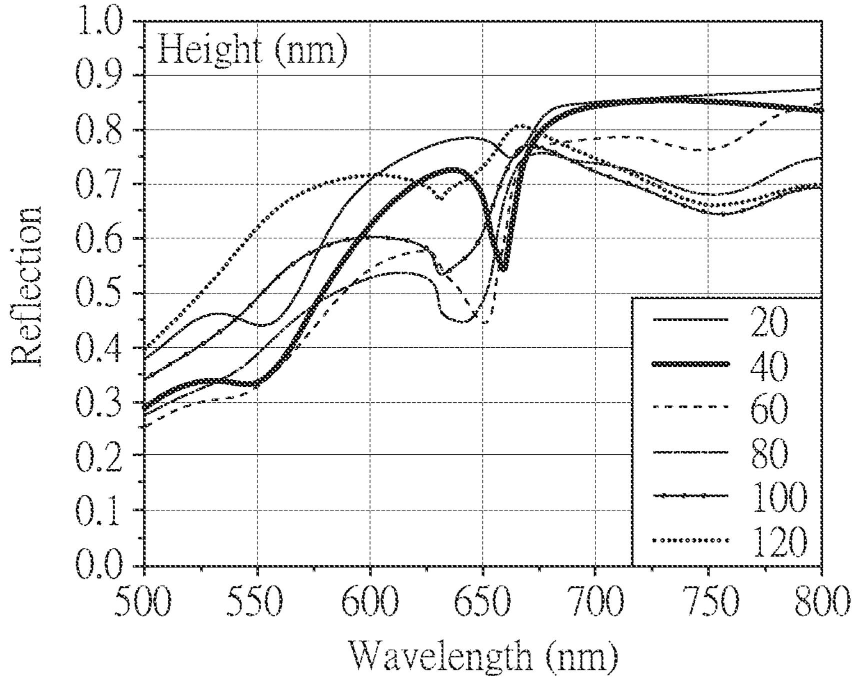
FIG. 4D to FIG. 4F are the simulated reflection spectra of SPR sensors having 430 nm-period with different structure heights, Au film thicknesses and structure widths.
Figure 4E:
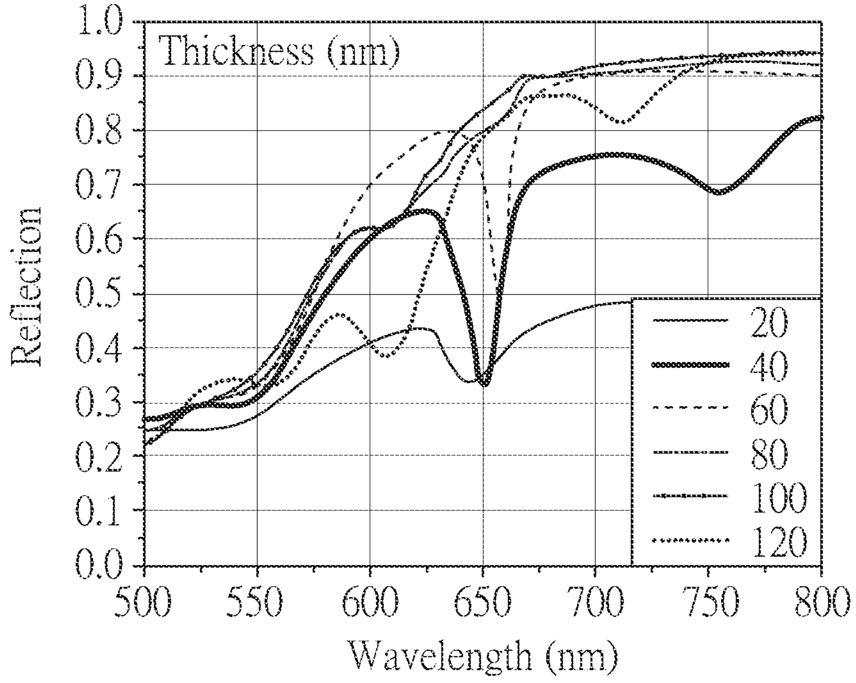
Figure 4F:
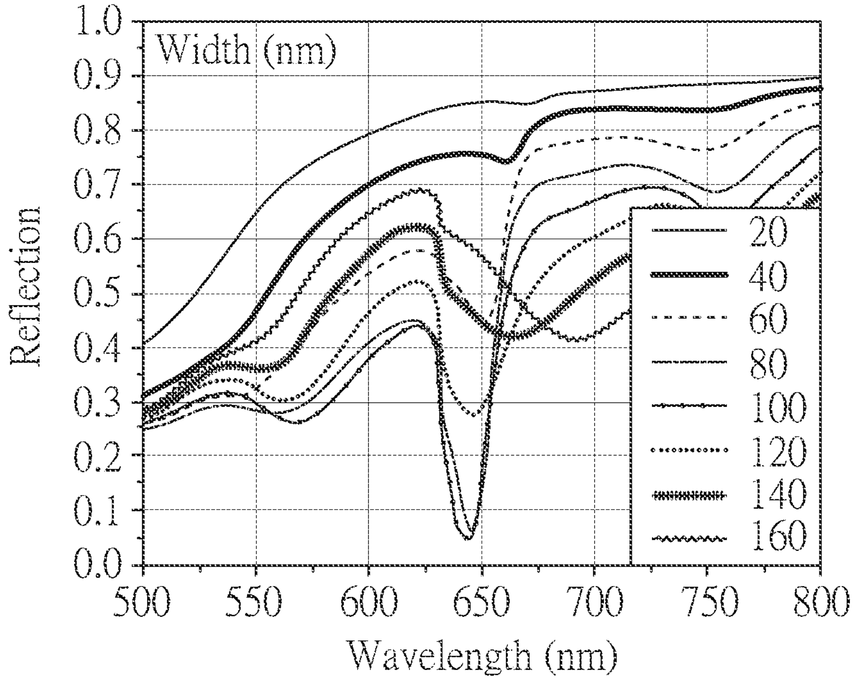

In conventional processing for silicon/silica-based chips, to coat an Au thin film on the silicon/silica surface, an adhesive layer needs to be deposited between Au and silica to stabilize the coating. FIG. 4A to FIG. 4C are the simulated reflection spectra of SPR sensors having 470 nm-period with different structure heights (i.e. the height H of the recess 411 shown in FIG. 2), Au film thicknesses (i.e. the thickness T1 of the metal layer 43 shown in FIG. 2) and structure widths (i.e. the width W of the metal lines 431 shown in FIG. 2). FIG. 4D to FIG. 4F are the simulated reflection spectra of SPR sensors having 430 nm-period with different structure heights (i.e. the height H of the recess 411 shown in FIG. 2), Au film thicknesses (i.e. the thickness T1 of the metal layer 43 shown in FIG. 2) and structure widths (i.e. the width W of the metal lines 431 shown in FIG. 2). From the results shown in FIG. 4A to FIG. 4F, it can be found that the interference of Ti can be reduced by adjusting the period, width, height and gold thickness of the nanostructures in the SPR spectral distribution at 600-650 nm.

Figure 5A:
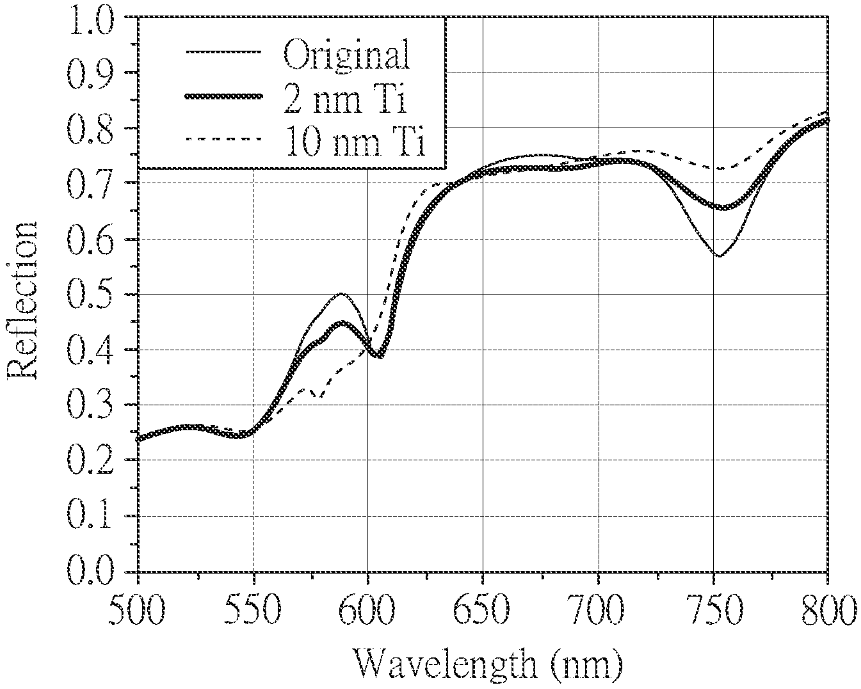
FIG. 5A to FIG. 5C are the simulated reflection spectra of SPR sensors having 430 nm-period with or without Ti adaptation layers, $Y_2O_3$ adaptation layers and APTES adaptation layers.
Figure 5B:
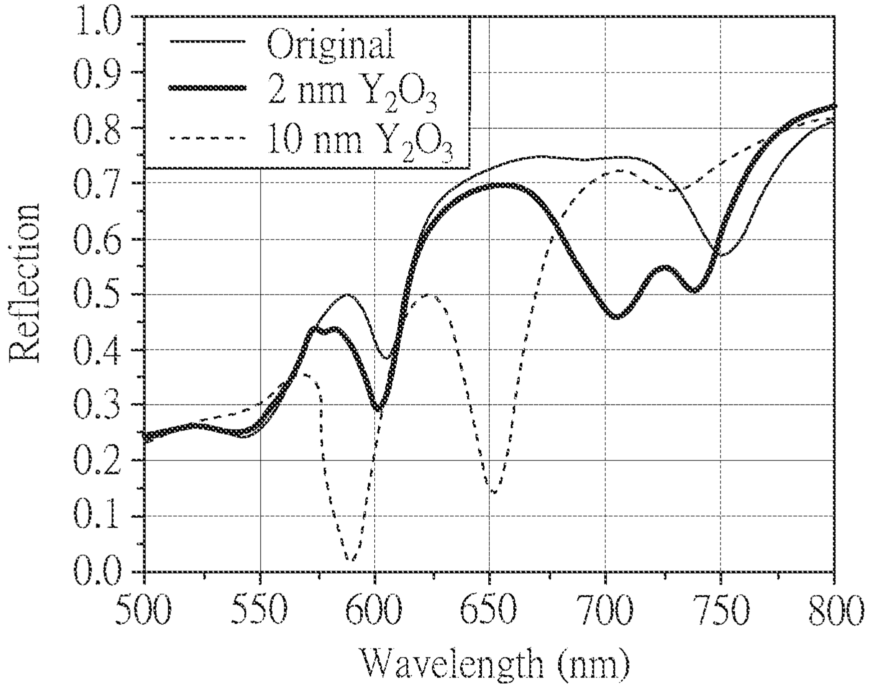
Figure 5C:
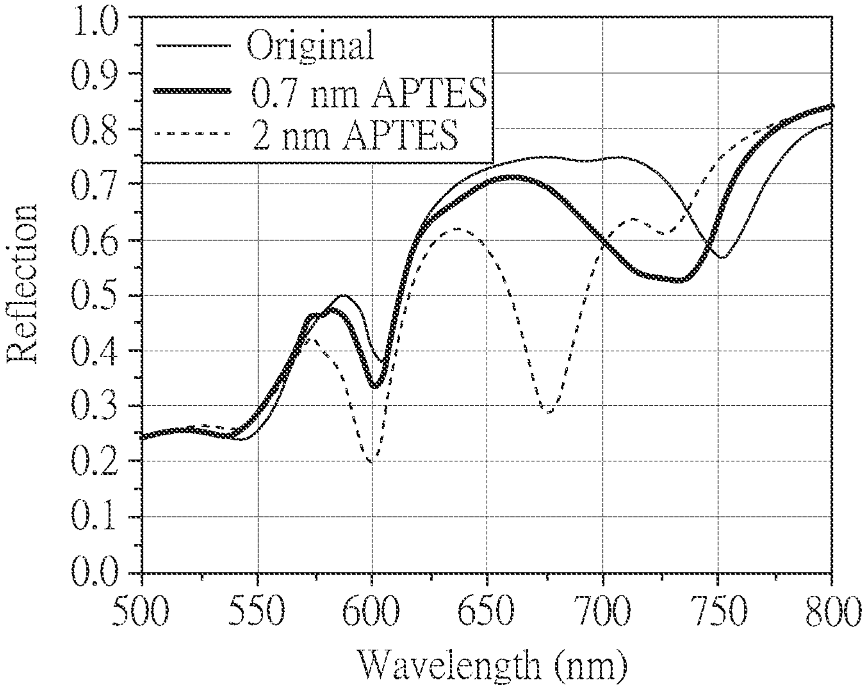
Figure 6A:
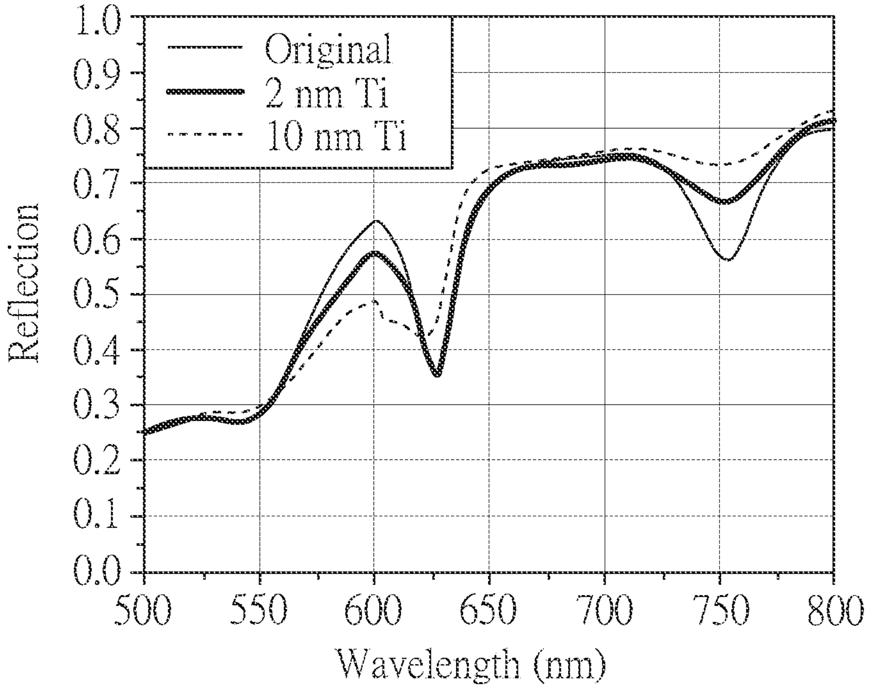
FIG. 6A to FIG. 6C are the simulated reflection spectra of SPR sensors having 450 nm-period with or without Ti adaptation layers, $Y_2O_3$ adaptation layers and APTES adaptation layers.
Figure 6B:
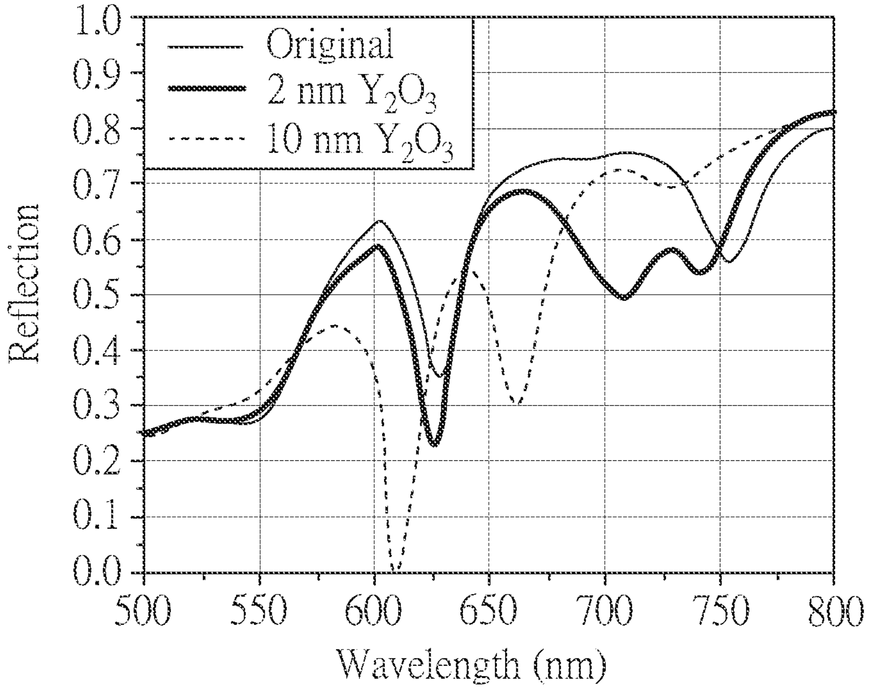
Figure 6C:
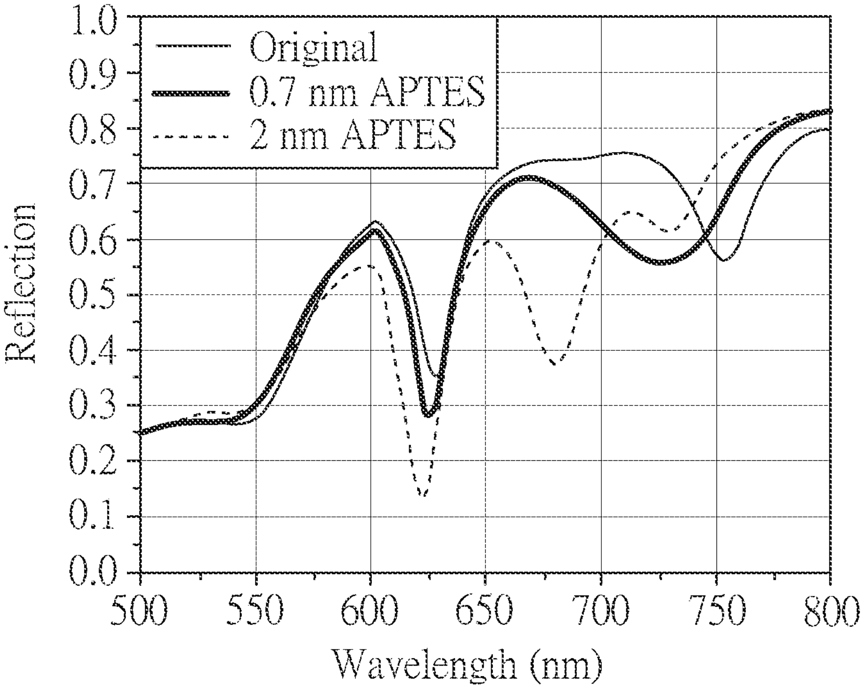
Figure 7A:
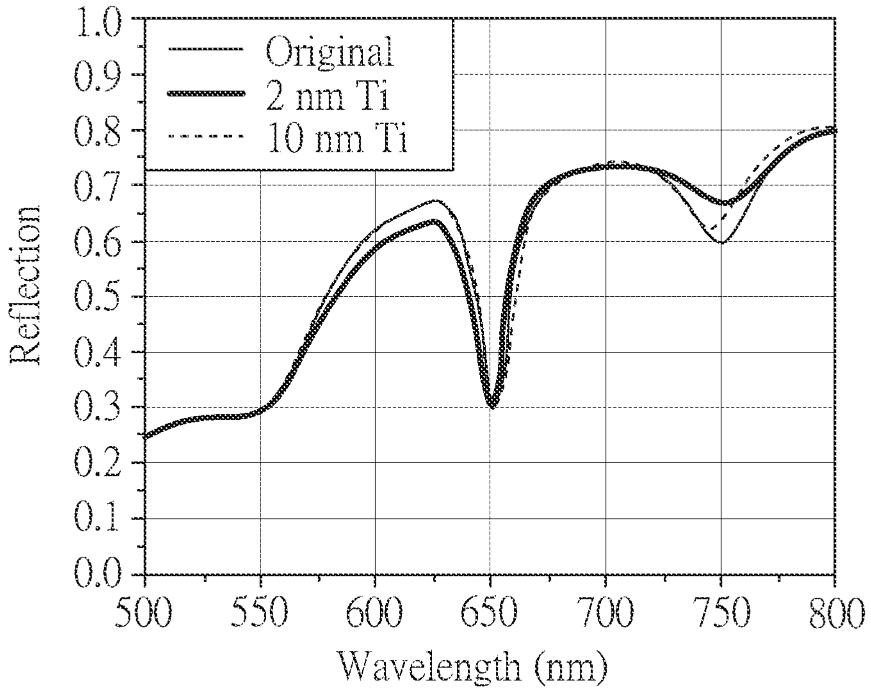
FIG. 7A to FIG. 7C are the simulated reflection spectra of SPR sensors having 470 nm-period with or without Ti adaptation layers, $Y_2O_3$ adaptation layers and APTES adaptation layers.
Figure 7B:
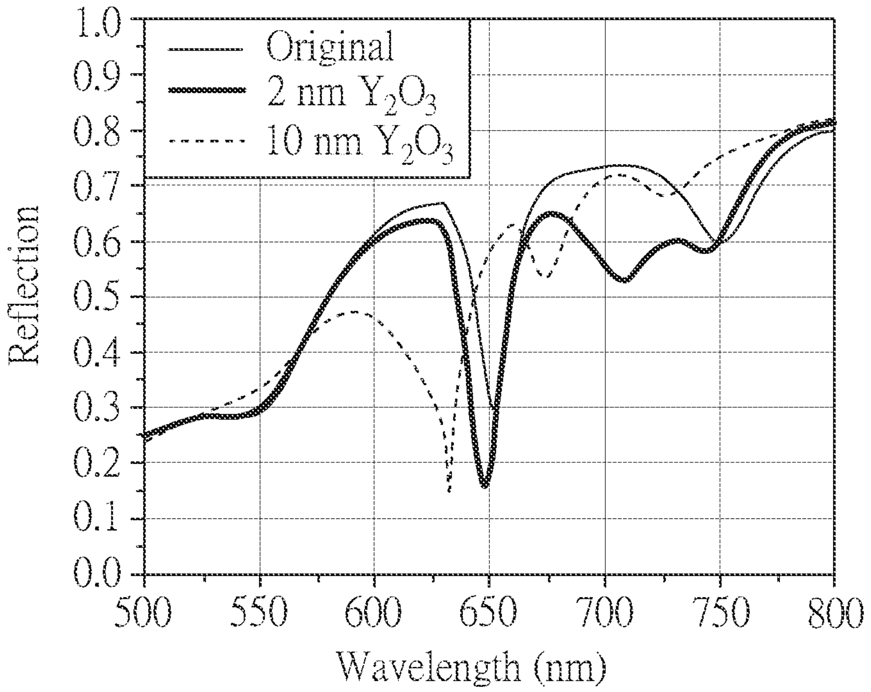
Figure 7C:
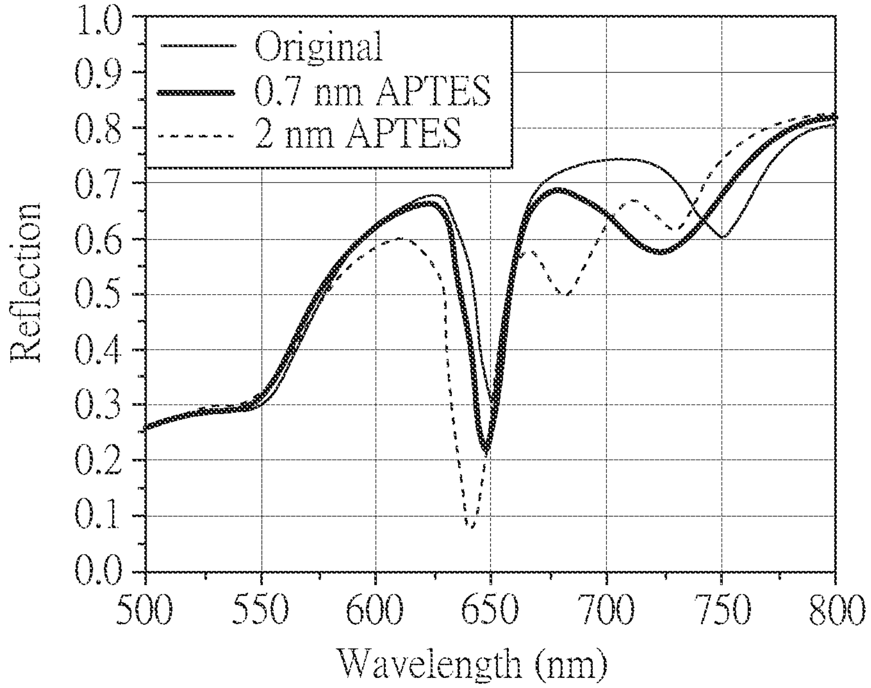

Furthermore, the reflectance spectra of different dielectric materials as adaptation layers are also simulated. FIG. 5A to FIG. 5C are the simulated reflection spectra of SPR sensors having 430 nm-period with or without Ti adaptation layers, $Y_2O_3$ adaptation layers and APTES adaptation layers. FIG. 6A to FIG. 6C are the simulated reflection spectra of SPR sensors having 450 nm-period with or without Ti adaptation layers, $Y_2O_3$ adaptation layers and APTES adaptation layers. FIG. 7A to FIG. 7C are the simulated reflection spectra of SPR sensors having 470 nm-period with or without Ti adaptation layers, $Y_2O_3$ adaptation layers and APTES adaptation layers. Taking Yttrium(III) oxide ($Y_2O_3$) and (3-Aminopropyl)triethoxysilane (APTES) as examples, the SPR reflection spectrum simulation results are compared with the results using Ti as the adaptation layer. The thicker the adaptation layer, the smaller the FWHM of the Fano resonance dip. The results show that it is possible to obtain higher SPR sensitivity in SPR applications if $Y_2O_3$ or APTES is used as the adaptation layer.

Figure 5D:
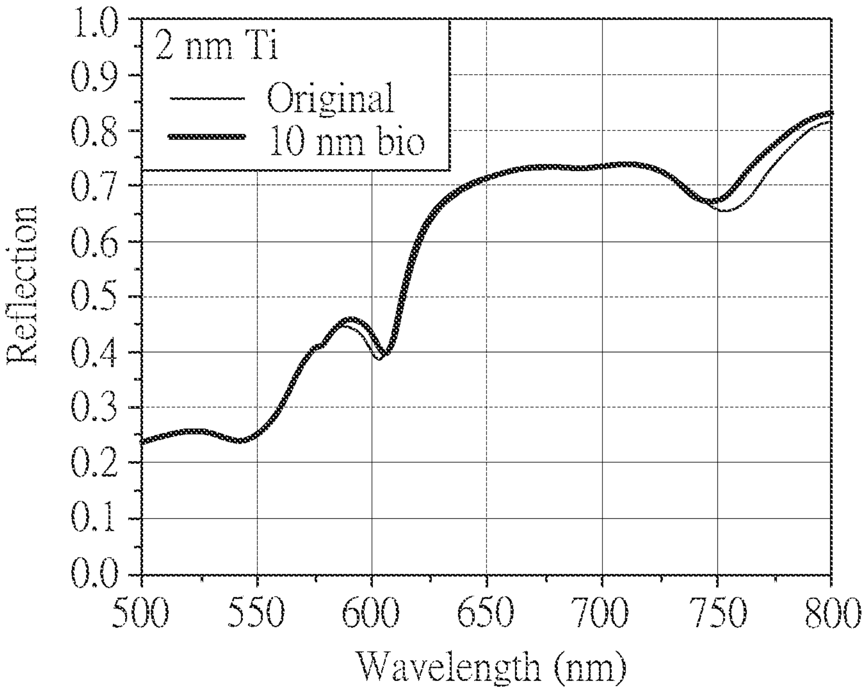
FIG. 5D to FIG. 5F are the simulated reflection spectra of SPR sensors having 430 nm-period with or without Ti adaptation layers, $Y_2O_3$ adaptation layers and APTES adaptation layers under 10 nm biomolecular layer.
Figure 5E:
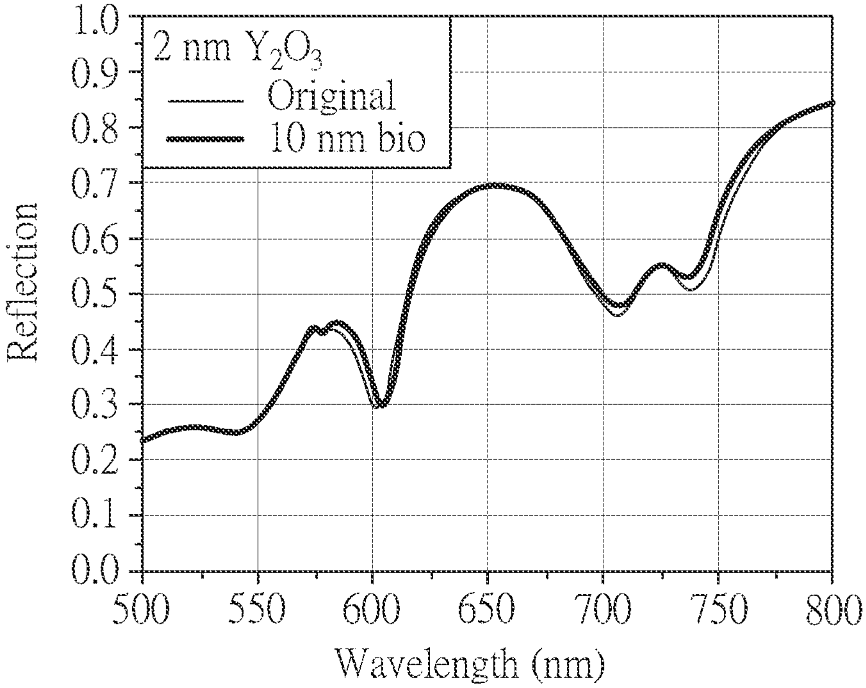
Figure 5F:
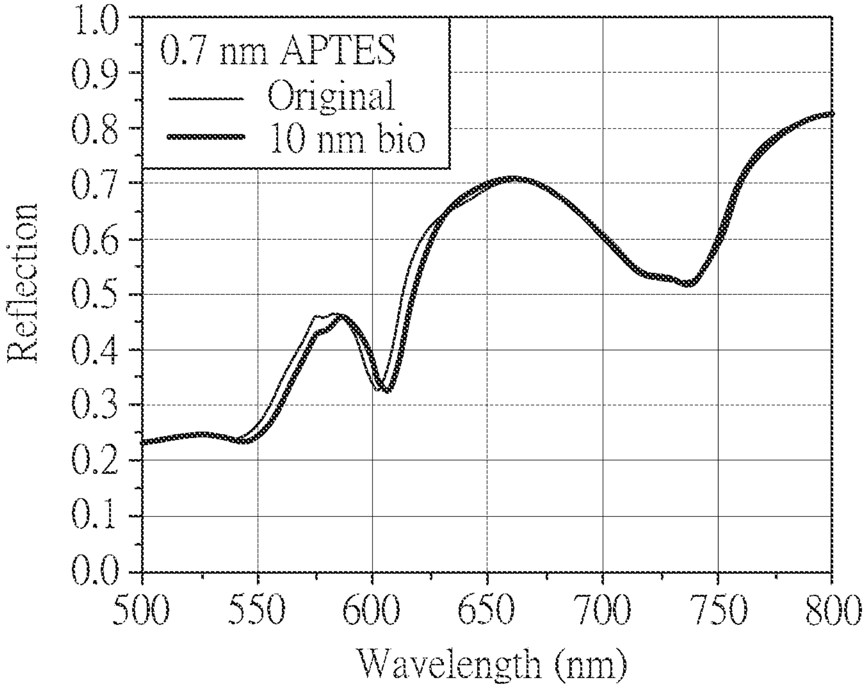
Figure 6D:
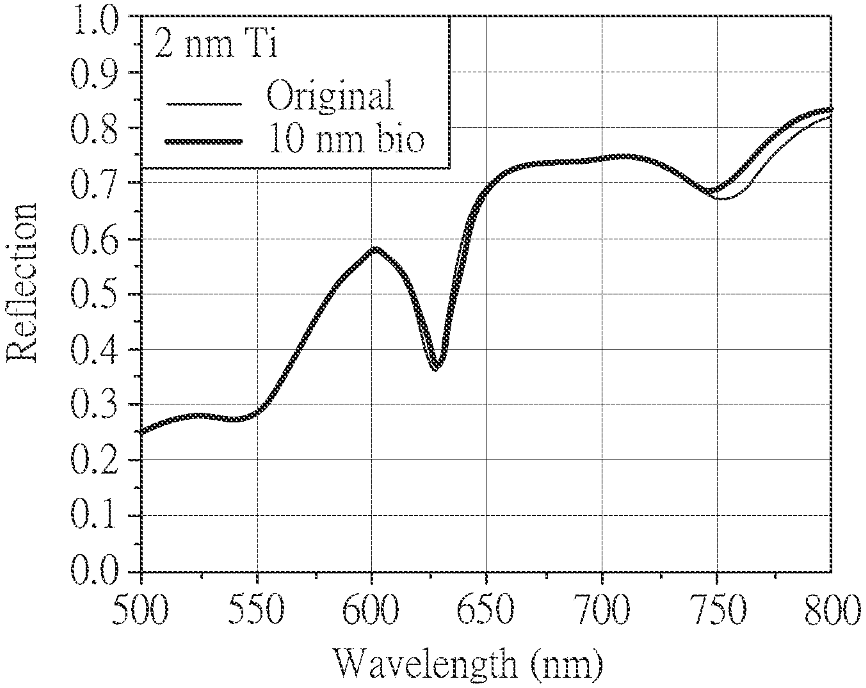
FIG. 6D to FIG. 6F are the simulated reflection spectra of SPR sensors having 450 nm-period with or without Ti adaptation layers, $Y_2O_3$ adaptation layers and APTES adaptation layers under 10 nm biomolecular layer.
Figure 6E:
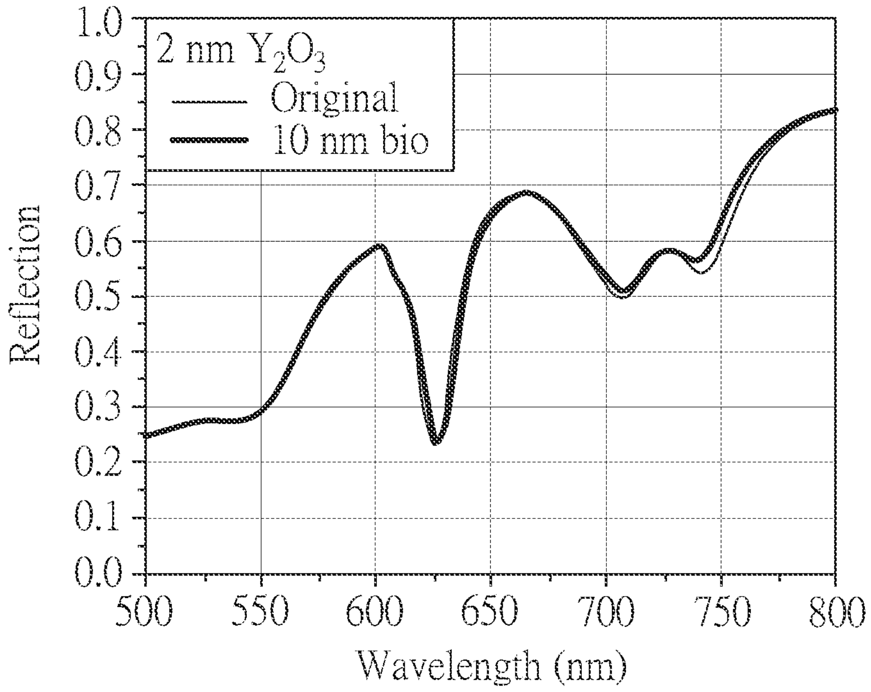
Figure 6F:
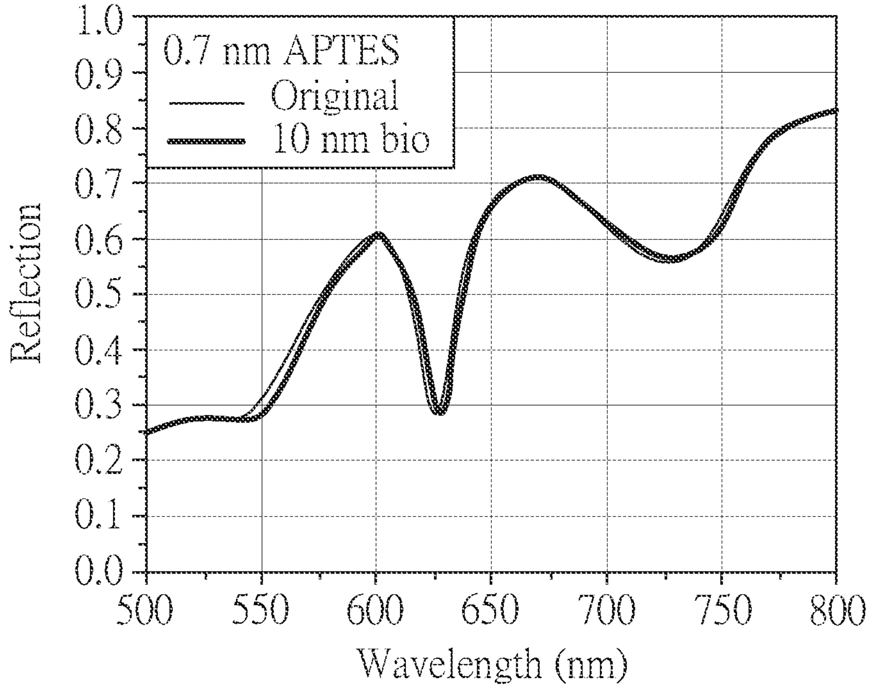
Figure 7D:
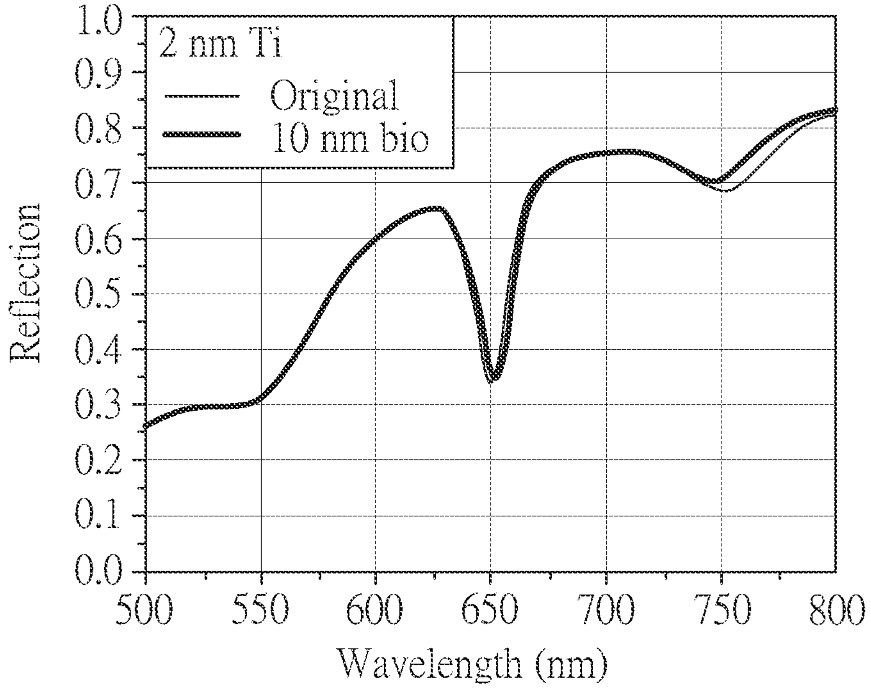
FIG. 7D to FIG. 7F are the simulated reflection spectra of SPR sensors having 470 nm-period with or without Ti adaptation layers, $Y_2O_3$ adaptation layers and APTES adaptation layers under 10 nm biomolecular layer.
Figure 7E:
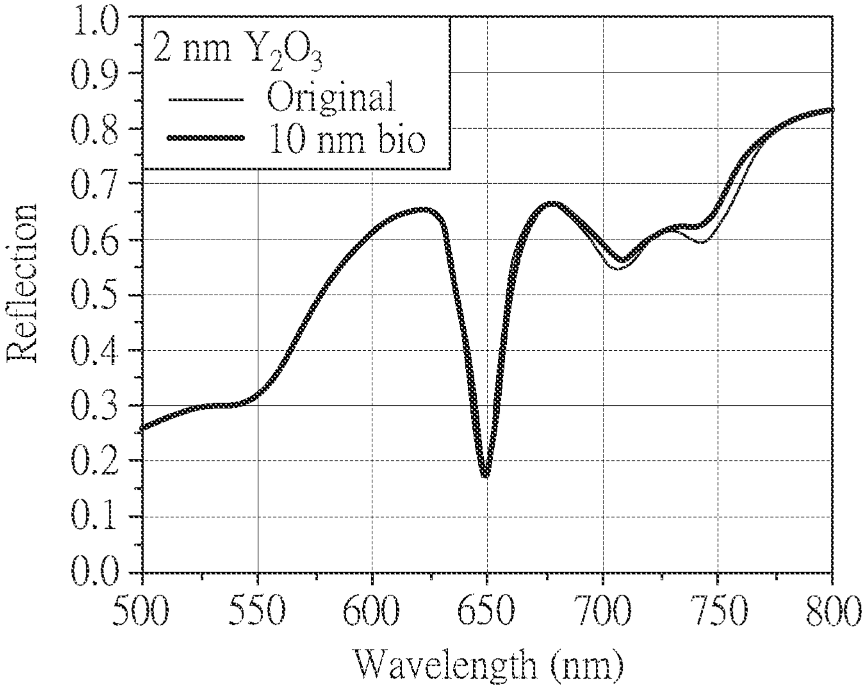
Figure 7F:
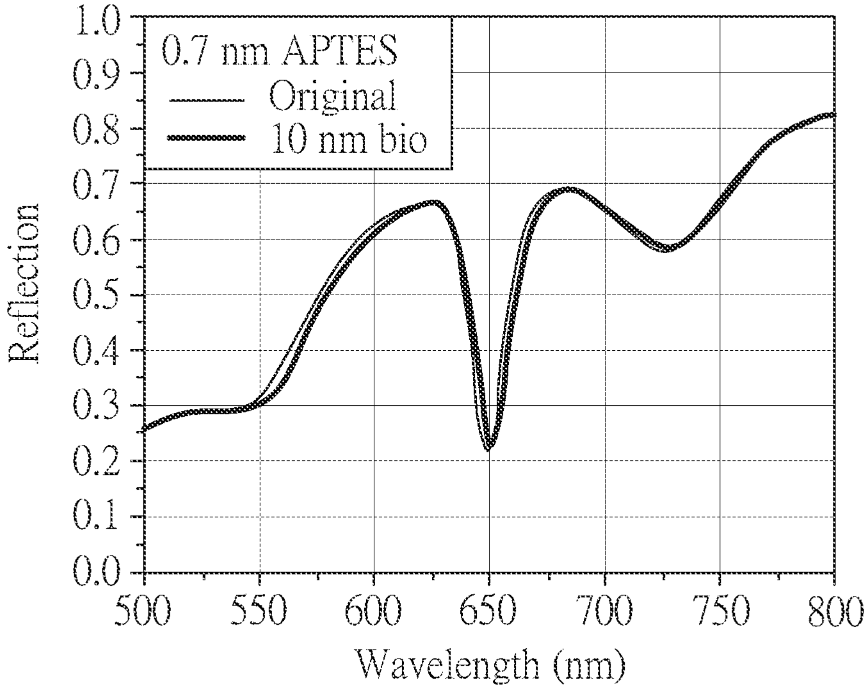

Moreover, the SPR spectrum as deposing 10 nm biomolecular layer is also simulated. FIG. 5D to FIG. 5F are the simulated reflection spectra of SPR sensors having 430 nm-period with or without Ti adaptation layers, $Y_2O_3$ adaptation layers and APTES adaptation layers under 10 nm biomolecular layer. FIG. 6D to FIG. 6F are the simulated reflection spectra of SPR sensors having 450 nm-period with or without Ti adaptation layers, $Y_2O_3$ adaptation layers and APTES adaptation layers under 10 nm biomolecular layer. FIG. 7D to FIG. 7F are the simulated reflection spectra of SPR sensors having 470 nm-period with or without Ti adaptation layers, $Y_2O_3$ adaptation layers and APTES adaptation layers under 10 nm biomolecular layer. The results show a significant change of the Fano resonance dip shift (~0.35 thickness of biomolecular layer (nm)/Fano resonance dip shift (nm)).

The above simulated results indicate that it has the potential to develop SPR sensing chip with higher sensitivity by using different dielectric materials as adaptation layers.

In the following experiments, as shown in FIG. 2, the substrate 41 is a silicon substrate and the metal layer 43 is a gold layer. The SPR sensor has the 410 nm-period, the width W of the metal lines 431 is 100 nm, the height H of the recesses 411 is 40 nm and the thickness of the Au layer is 40 nm. In addition, in the following experiments, the SPR sensor without the cover substrate 45 shown in FIG. 2 is used for simulation. The simulation method is similar to that described above, and is not repeated here.

Figure 8A:
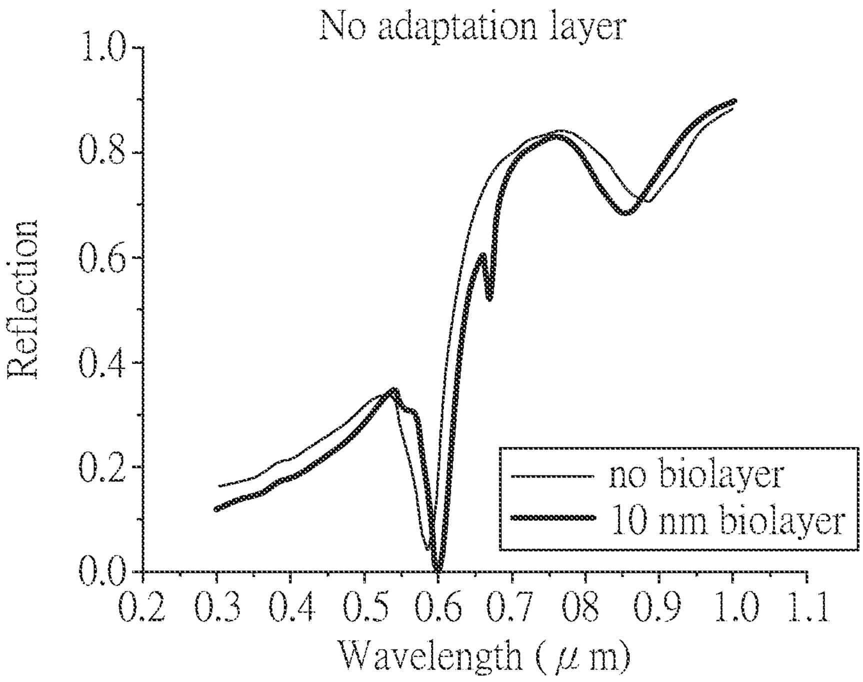
FIG. 8A are the simulated reflection spectra of SPR sensors having 410 nm-period without the adaptation layer under 10 nm biomolecular layer.
Figure 8B:
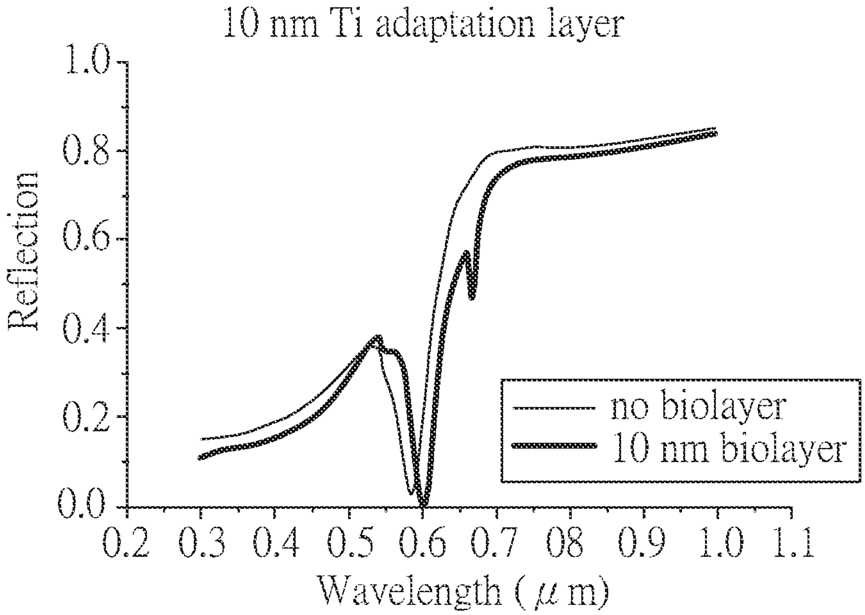
FIG. 8B and FIG. 8C are the simulated reflection spectra of SPR sensors having 410 nm-period with 10 nm and 20 nm Ti adaptation layers under 10 nm biomolecular layer.
Figure 8C:
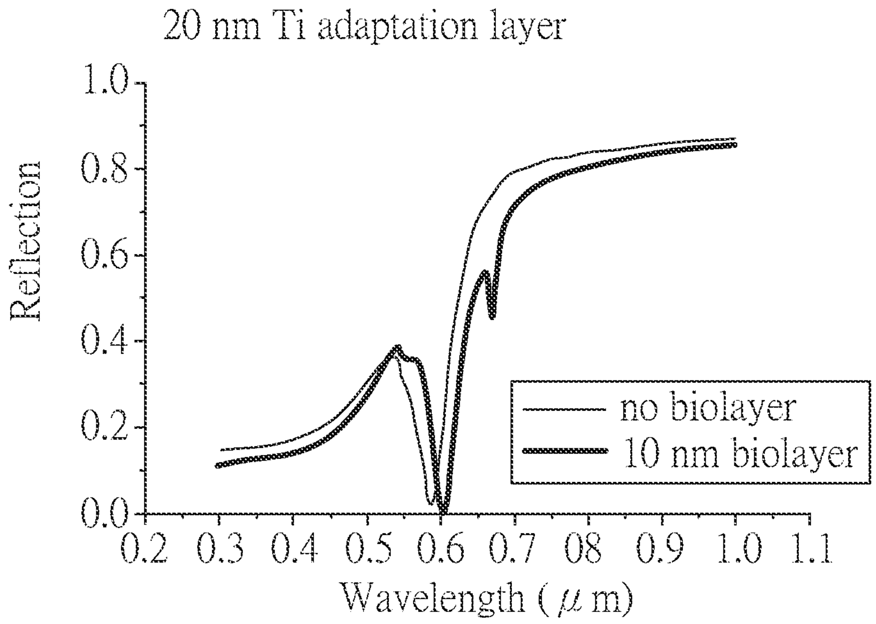
Figure 8D:
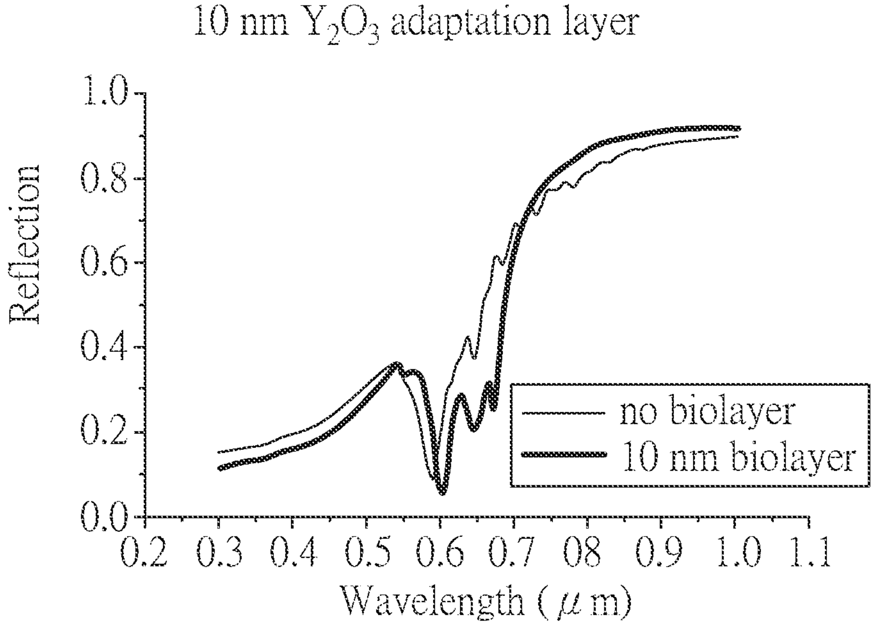
FIG. 8D and FIG. 8E are the simulated reflection spectra of SPR sensors having 410 nm-period with 10 nm and 20 nm $Y_2O_3$ adaptation layers under 10 nm biomolecular layer.
Figure 8E:
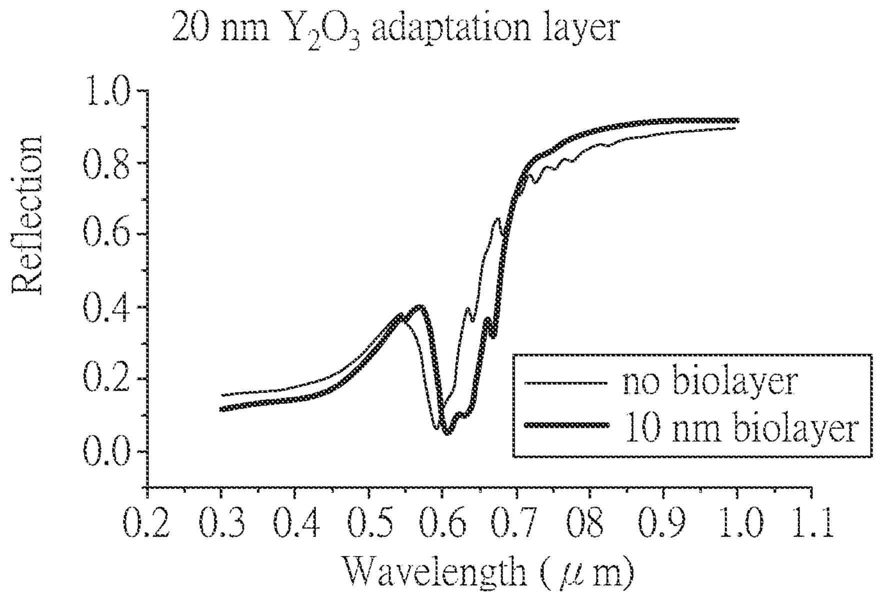
Figure 8F:
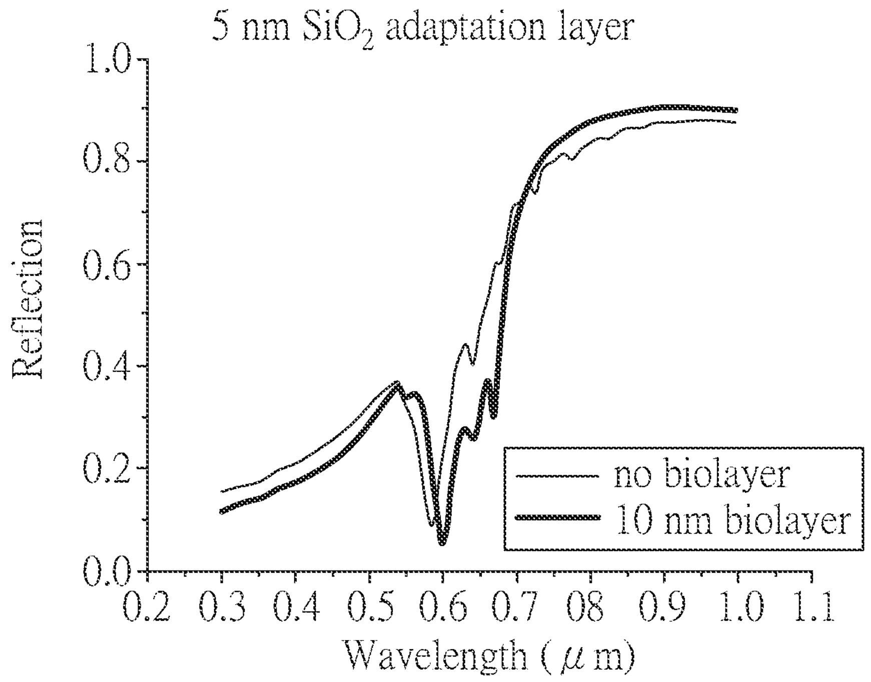
FIG. 8F to FIG. 8H are the simulated reflection spectra of SPR sensors having 410 nm-period with 5 nm, 10 nm and 20 nm $SiO_2$ adaptation layers under 10 nm biomolecular layer.
Figure 8G:
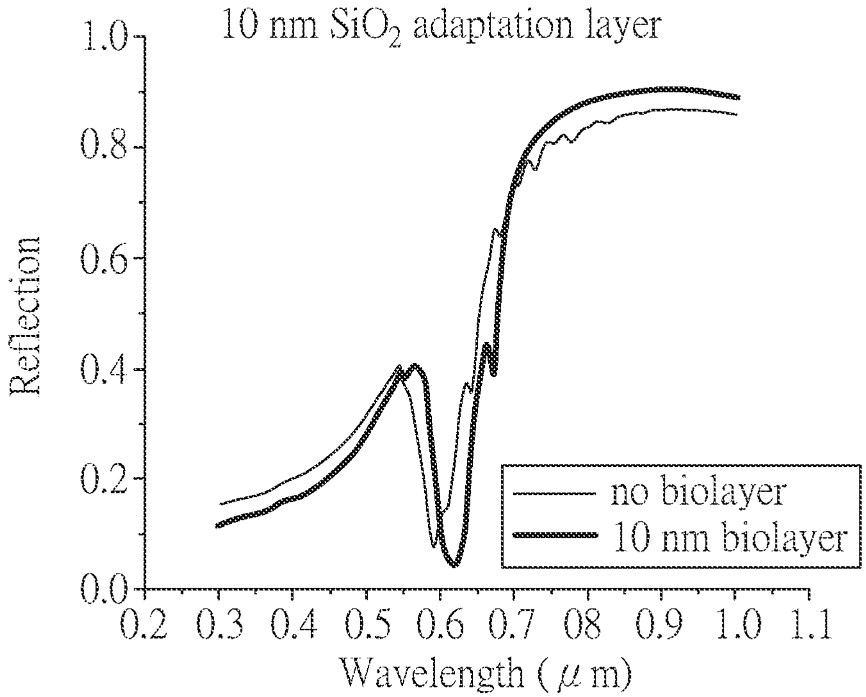
Figure 8H:
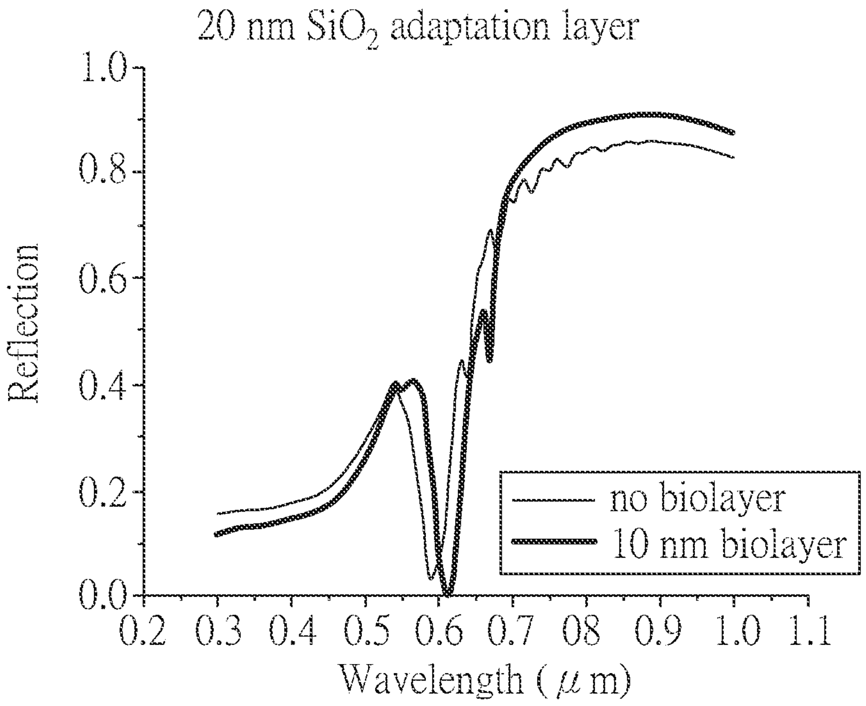
Figure 9:
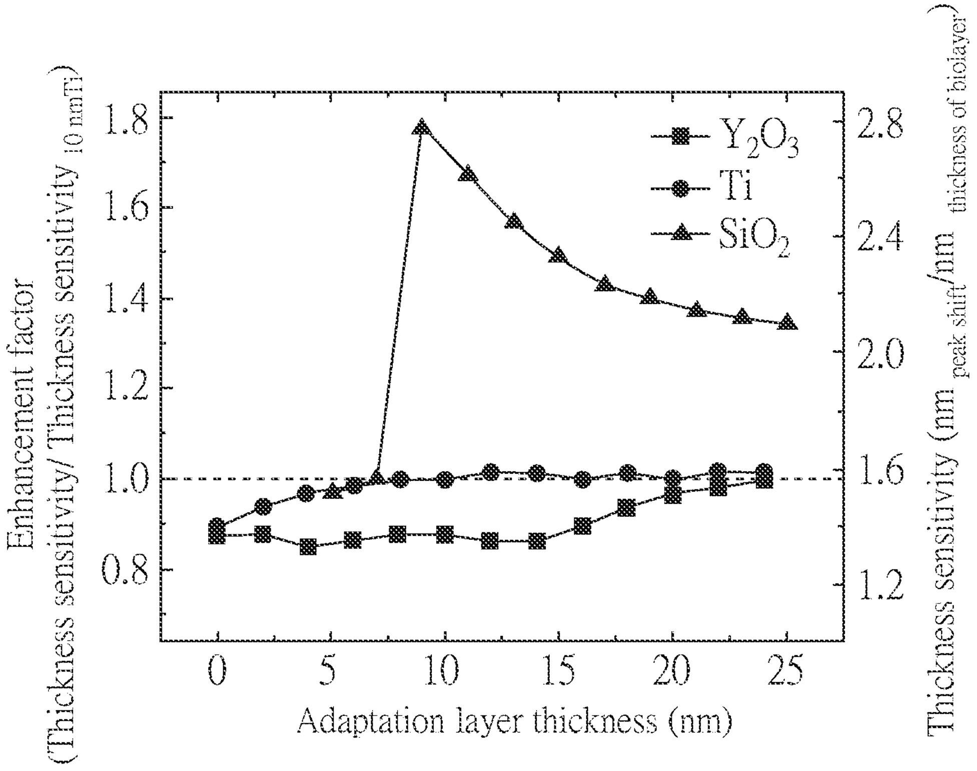
FIG. 9 is a diagram showing the relationship between the thickness of different adaptation layers ($Y_2O_3$, Ti and $SiO_2$ adaptation layers) and the thickness sensitivity/the enhancement factor.

FIG. 8A are the simulated reflection spectra of SPR sensors having 410 nm-period without the adaptation layer under 10 nm biomolecular layer. FIG. 8B and FIG. 8C are the simulated reflection spectra of SPR sensors having 410 nm-period with 10 nm and 20 nm Ti adaptation layers under 10 nm biomolecular layer. FIG. 8D and FIG. 8E are the simulated reflection spectra of SPR sensors having 410 nm-period with 10 nm and 20 nm $Y_2O_3$ adaptation layers under 10 nm biomolecular layer. FIG. 8F to FIG. 8H are the simulated reflection spectra of SPR sensors having 410 nm-period with 5 nm, 10 nm and 20 nm $SiO_2$ adaptation layers under 10 nm biomolecular layer. FIG. 9 is a diagram showing the relationship between the thickness of different adaptation layers ($Y_2O_3$, Ti and $SiO_2$ adaptation layers) and the thickness sensitivity/the enhancement factor. Here, thickness sensitivity is defined as the dip wavelength shift (nm) divided by the biomolecular layer thickness (nm), and the enhancement factor is defined as the thickness sensitivity divided by the thickness sensitivity of the 10 nm Ti adaptation layer.

As shown in FIG. 9, the simulation data suggests that when the thickness of $SiO_2$ as the adaptation layer exceeds 7.5 nm, the thickness sensitivity is better than that of Ti, the conventional method for stabilizing Au thin film on the Si surface.

Even not shown, add a dielectric adaptation layer between gold film and silicon nanoslits will increase the photons in the dielectric layer and reduce the decay length on the gold surface. The shortened decay length increases the thickness sensitivity, while the increased photons in the dielectric layer reduces the sensitivity. There is a tradeoff between the dielectric thickness and refractive index. The optimal condition is to use $SiO_2$ film with 10 nm thickness. The gold film cannot adhere to $SiO_2$ well, therefore an additional organ silane compounds like 3-aminopropyl triethoxysilane (APTES), and mercaptosilane is used.

Based on this insight, an experiment to explore the thickness sensitivity analysis of silicon-based SPR chips with varying adaptation layer designs is performed. Four distinct chip configurations, each repeated three times, were prepared. These configurations featured coatings of 5 nm $SiO_2$, 10 nm $SiO_2$, 20 nm $SiO_2$, and 10 nm Ti film on silicon-based SPR chips. Subsequently, the chips were coated with 40 nm Au thin film to induce SPR signals. Notably, the Au film cannot stably attach to the $SiO_2$ surface. Therefore, the SiO-coated chips required an additional coating of (3-Aminopropyl) triethoxysilane (APTES) layer (thickness ~1 nm) before being coated with Au.

Figure 10:
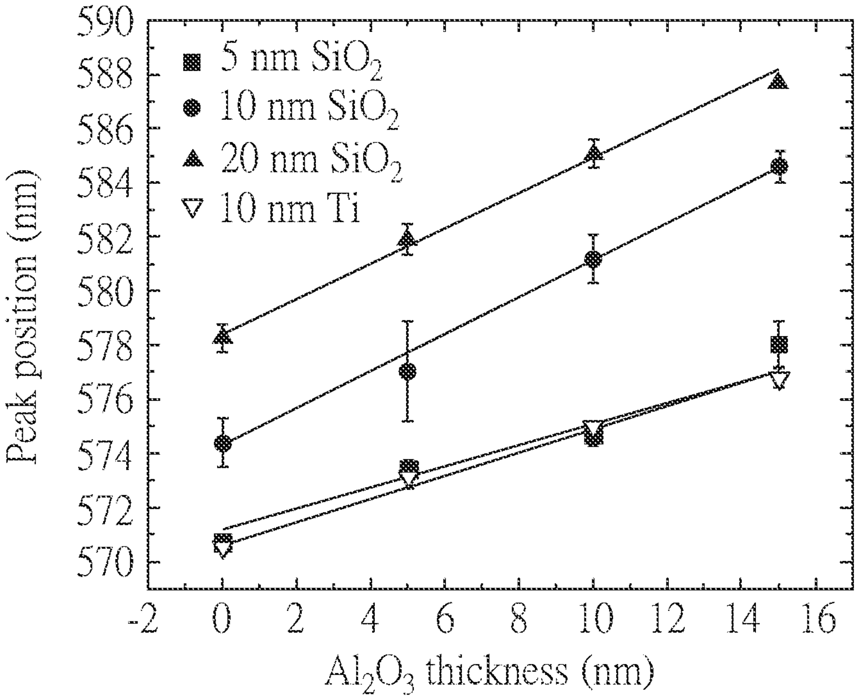
FIG. 10 is a diagram showing the relationship between SPR peak shift and the $Al_2O_3$ thickness on SPR sensors with different adaptation layers (Ti and $SiO_2$ adaptation layers).

For the purpose of thickness sensitivity testing, $Al_2O_3$ was employed as the testing target. Prior to $Al_2O_3$ deposition by atomic layer deposition (ALD) on the Au film, the reflection spectrum of each chip was measured using a spectrometer. Subsequently, a 5 nm $Al_2O_3$ coating was applied on the Au film, and this process was repeated three times. The information on the peak shifts in the reflectance spectra caused by the SPR phenomenon for 0 nm, 5 nm, 10 nm and 15 nm $Al_2O_3$ films can be obtained. The results are shown in FIG. 10, which is a diagram showing the relationship between SPR peak shift and the $Al_2O_3$ thickness on SPR chip with different adaptation layers (Ti and $SiO_2$ adaptation layers).

Figure 11:
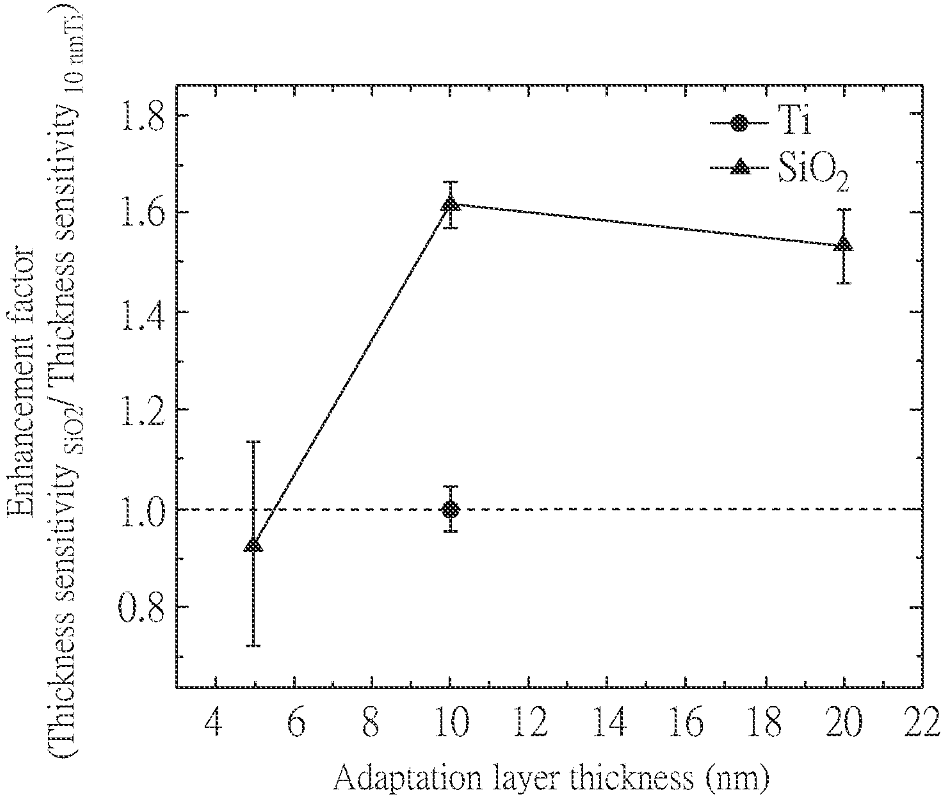
FIG. 11 is a diagram showing the relationship between the thickness of different adaptation layers (Ti and $SiO_2$ adaptation layers) and the enhancement factor.

In addition, FIG. 11 is a diagram showing the relationship between the thickness of different adaptation layers (Ti and $SiO_2$ adaptation layers) and the enhancement factor. The analysis of the measurement data, as shown in FIG. 11, reveals distinct thickness sensitivities for each coating configuration. The thickness sensitivity is defined as dip wavelength shift (nm) divided by the thickness of the $Al_2O_3$ layer, and the enhancement factor is defined as the thickness sensitivity divided by the thickness sensitivity of the 10 nm Ti adaptation layer. The enhancement factor values are as follows: 5 nm $SiO_2$ (0.9), 10 nm $SiO_2$ (1.6), and 20 nm $SiO_2$ (1.5). The observed trend in the measurement data shown in FIG. 11 is consistent with the simulated result shown in FIG. 9, validating that the use of $SiO_2$ as an adaptation layer has the potential to enhance the thickness sensitivity of biomembranes compared to the conventional method employing Ti as the adhesion layer.

In conclusion, in the SPR sensor of the present invention, the dielectric material with low SPR signal interference is used in the adaptation layer, and the specific signal-enhancing metallic nanostructures is also provided to produce high-throughput fluid-integrated reflective SPR chips as novel biomolecular sensing/screening platforms.

In addition, the dielectric material (ex. silica) is used in the adaptation layer to regulate the plasma distribution. According to the simulation results, with the adaptation layer, although the SPR response peak becomes broad, the red shift resulting from the biomolecular layer seems to be increased. It also causes increasing SPR sensitivity. Moreover, the parameters of the adaptation layer are also critical. If the properties of the adaptation layer match the biomolecular layer, a destructive interference may happen that makes the substrate-mode SPR disappear which can enhance the sensitivity of biomolecular thickness.

Although the present invention has been explained in relation to its embodiment, it is to be understood that many other possible modifications and variations can be made without departing from the spirit and scope of the invention as hereinafter claimed.

The invention claimed is:

1. A surface plasmon resonance sensor, comprising:
- a substrate with plural substrate recesses;
- an adaptation layer disposed on the substrate and in the plural substrate recesses, and comprising a dielectric material, wherein the adaptation layer has a multi-layer structure; and
- a metal layer disposed on the adaptation layer and in the plural substrate recesses, wherein the metal layer has a grating structure comprising plural metal lines.

2. The surface plasmon resonance sensor of claim 1, wherein the adaptation layer comprises a metal oxide, a silane compound or a combination thereof.

3. The surface plasmon resonance sensor of claim 1, wherein the adaptation layer comprise Y2O3, SiO2, (3-aminopropyl)triethoxysilane (APTES), or a combination thereof.

4. The surface plasmon resonance sensor of claim 1, wherein the plural metal lines are substantially parallel to each other.

5. The surface plasmon resonance sensor of claim 1, wherein the grating structure has a period of between 300 nm and 800 nm.

6. The surface plasmon resonance sensor of claim 1, wherein the thickness of the adaptation layer is greater than or equal to 0.5 nm and less than or equal to 50 nm.

7. The surface plasmon resonance sensor of claim 1, wherein the grating structure further comprises plural recesses, the plural recesses and the plural metal lines are alternately arranged, and the plural recesses respectively have a depth less than or equal to 200 nm.

8. The surface plasmon resonance sensor of claim 1, wherein the plural metal lines respectively have a width greater than or equal to 20 nm and less than or equal to 200 nm.

9. The surface plasmon resonance sensor of claim 1, wherein the thickness of the metal layer is greater than or equal to 20 nm and less than or equal to 200 nm.

10. The surface plasmon resonance sensor of claim 1, wherein the metal layer comprises gold.

11. A surface plasmon resonance sensing instrument, comprising: the surface plasmon resonance sensor of claim 1.

12. The surface plasmon resonance sensing instrument of claim 11, further comprising:
- a light source;
- a polarizer disposed between the light source and the surface plasmon resonance sensor, wherein light emitting from the light source is converted into the polarized light by the polarizer to provide a polarized light onto the surface plasmon resonance sensor; and
- a detector arranged to detect the polarized light reflected by the surface plasmon resonance sensor.

13. The surface plasmon resonance sensing instrument of claim 12, further comprising:

a collimator disposed between the light source and the surface plasmon resonance sensor.

14. The surface plasmon resonance sensing instrument of claim 12, further comprising:

a dichroic mirror disposed between the light source and the surface plasmon resonance sensor, wherein the polarized light is reflected by the dichroic mirror to reach the surface plasmon resonance sensor, and the polarized light reflected by the surface plasmon resonance sensor passes through the dichroic mirror to reach the detector.

15. A method for detecting an analyte, comprising the following steps: providing the surface plasmon resonance sensor of claim 1; providing polarized light onto the surface plasmon resonance sensor; and detecting the polarized light reflected by the surface plasmon resonance sensor by a detector to obtain a reflectance spectrum.

* * * * *